United States Patent
Holmes

(10) Patent No.: US 10,632,779 B2
(45) Date of Patent: Apr. 28, 2020

(54) SECURITY DEVICE AND METHOD OF MANUFACTURE THEREOF

(71) Applicant: DE LA RUE INTERNATIONAL LIMITED, Basingstoke, Hampshire (GB)

(72) Inventor: Brian William Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 15/746,229

(22) PCT Filed: Jul. 22, 2016

(86) PCT No.: PCT/GB2016/052224
§ 371 (c)(1),
(2) Date: Jan. 19, 2018

(87) PCT Pub. No.: WO2017/017418
PCT Pub. Date: Feb. 2, 2017

(65) Prior Publication Data
US 2018/0215189 A1    Aug. 2, 2018

(30) Foreign Application Priority Data

Jul. 24, 2015  (GB) .................................. 1513094.1

(51) Int. Cl.
*B29D 11/00* (2006.01)
*B42D 25/328* (2014.01)
(Continued)

(52) U.S. Cl.
CPC ........... *B42D 25/328* (2014.10); *B42D 25/21* (2014.10); *B42D 25/29* (2014.10); *B42D 25/324* (2014.10);
(Continued)

(58) Field of Classification Search
CPC . B29D 11/0074; B42D 25/324; B42D 25/328
USPC ........................................... 359/2, 569, 567
See application file for complete search history.

(56) References Cited

U.S. PATENT DOCUMENTS 5,886,798 A    3/1999  Staub et al.
9,678,156 B2 * 6/2017  Wang .................. G06F 17/5045
(Continued)

FOREIGN PATENT DOCUMENTS

| WO | 2007/149692 A2 | 12/2007 |
| WO | 2008/152389 A2 | 12/2008 |
| WO | 2010/121293 A1 | 10/2010 |

OTHER PUBLICATIONS

Jan. 26, 2016 Search Report issued in British Patent Application No. GB1513094.1.
(Continued)

*Primary Examiner* — Audrey Y Chang
(74) *Attorney, Agent, or Firm* — Oliff PLC

(57) ABSTRACT

A diffractive security device is disclosed, including first and second diffractive structures defined in a carrier layer. The first diffractive structure is a diffractive zone plate structure of a continuously curved surface configured such that when the device is illuminated by on-axis light, a first diffraction pattern generated by the first diffractive structure can be viewed from at least a first side of the device at substantially all viewing angles, the first diffraction pattern exhibiting a reference point or reference line relative to which other features of the first diffraction pattern appear to move when the viewing angle is changed. The second diffractive structure is an off-axis diffractive structure configured such that when the device is illuminated by on-axis light a second diffraction pattern generated by the second diffractive structure can be viewed from at least the first side of the device at at least some off-axis viewing angles.

24 Claims, 21 Drawing Sheets

(51) Int. Cl.
- *B42D 25/425* (2014.01)
- *B42D 25/29* (2014.01)
- *B42D 25/324* (2014.01)
- *B42D 25/21* (2014.01)
- *G07D 7/00* (2016.01)
- *B42D 25/373* (2014.01)
- *B42D 25/435* (2014.01)
- *G02B 5/18* (2006.01)
- *B42D 25/23* (2014.01)
- *B42D 25/24* (2014.01)
- *B42D 25/378* (2014.01)

(52) U.S. Cl.
CPC ......... *B42D 25/373* (2014.10); *B42D 25/425* (2014.10); *B42D 25/435* (2014.10); *G02B 5/1876* (2013.01); *G07D 7/0032* (2017.05); *B42D 25/23* (2014.10); *B42D 25/24* (2014.10); *B42D 25/378* (2014.10)

(56) References Cited

U.S. PATENT DOCUMENTS

| | | |
|---|---|---|
| 2004/0130760 A1* | 7/2004 | Schilling .............. B42D 25/328 359/2 |
| 2006/0072225 A1 | 4/2006 | Schilling et al. |
| 2008/0067801 A1 | 3/2008 | Schilling et al. |
| 2009/0008923 A1 | 1/2009 | Kaule et al. |
| 2009/0317595 A1 | 12/2009 | Brehm et al. |
| 2014/0247499 A1 | 9/2014 | Doublet et al. |

OTHER PUBLICATIONS

Oct. 21, 2016 Search Report issued in International Patent Application No. PCT/GB2016/052224.

Oct. 21, 2016 Written Opinion issued in International Patent Application No. PCT/GB2016/052224.

* cited by examiner

12a

12b

12c

12d

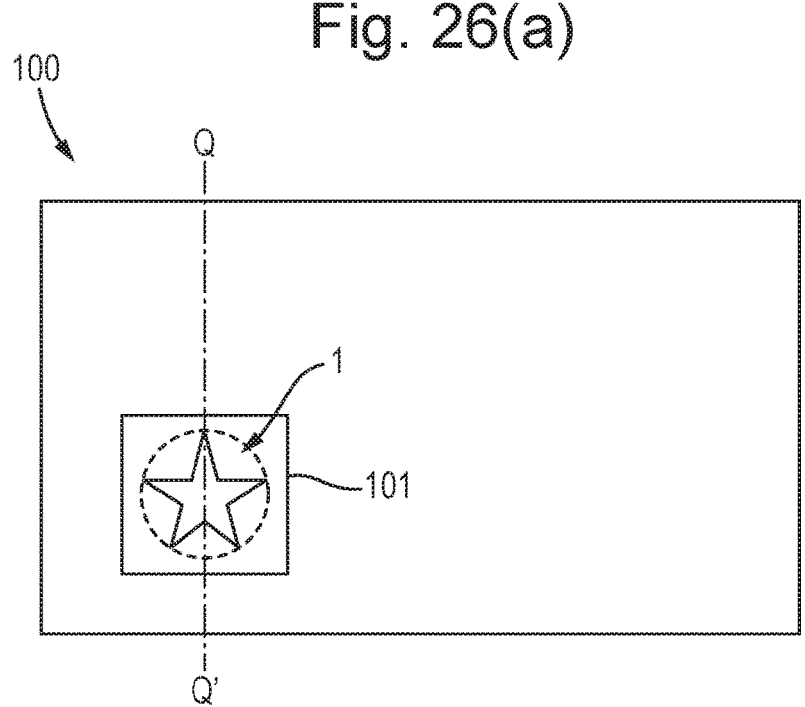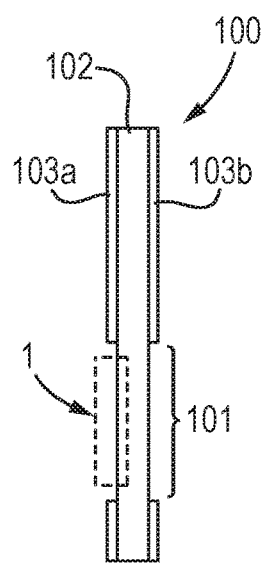

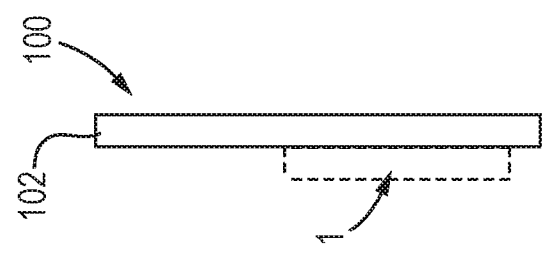
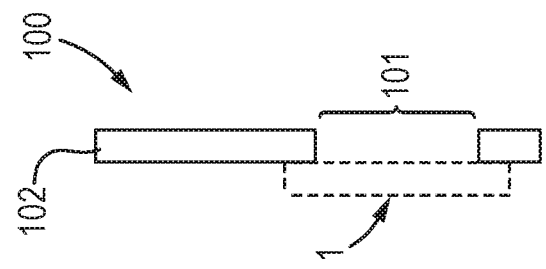
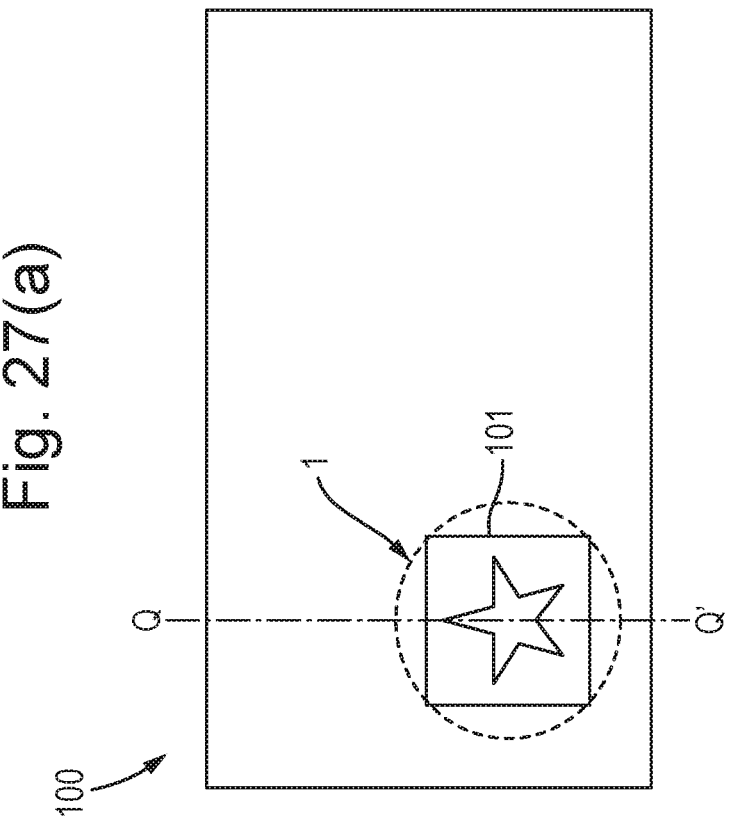

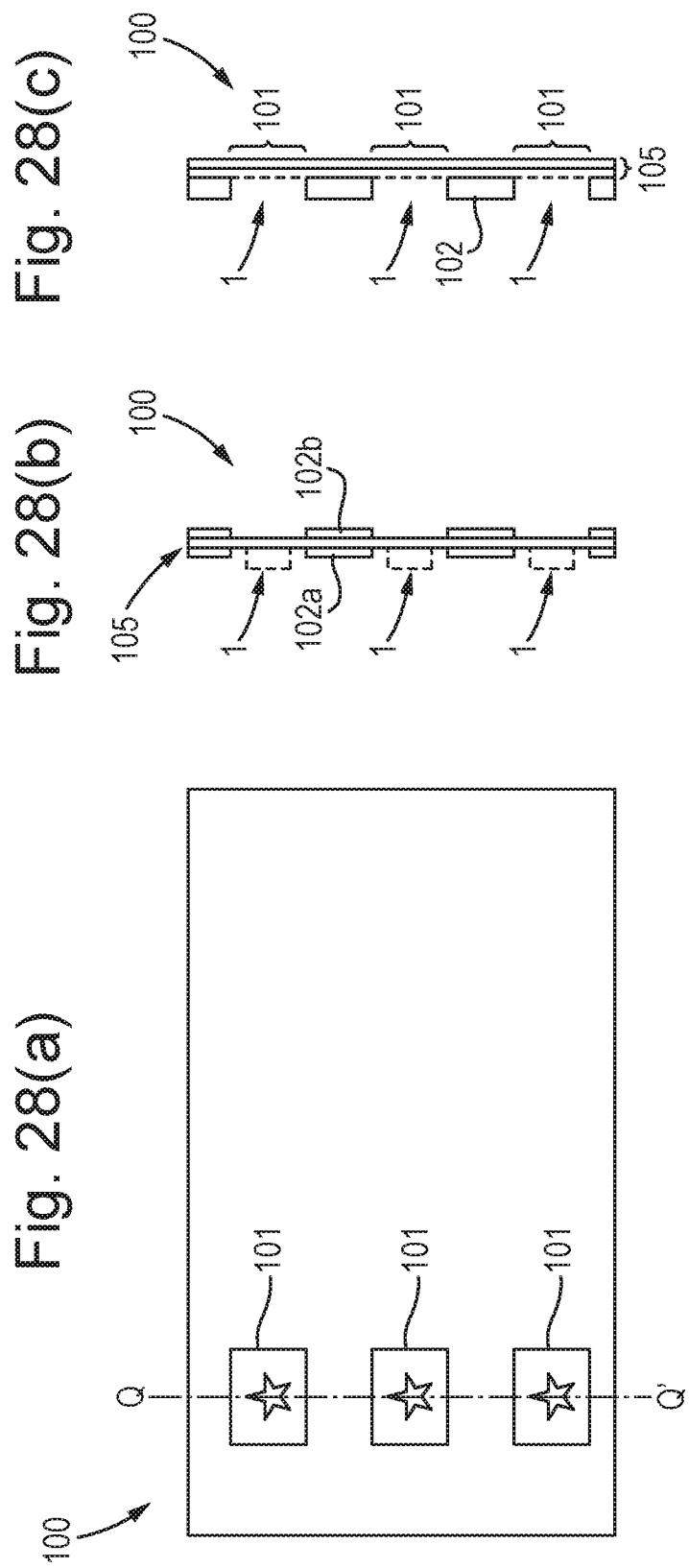

SECURITY DEVICE AND METHOD OF MANUFACTURE THEREOF

This invention relates to security devices for use in checking the authenticity of articles of value, particularly security documents such as banknotes, passports, identity documents, driving licenses, stamps, visas and the like. Methods of making the security devices are also disclosed.

Articles of value, and particularly documents of value such as banknotes, cheques, passports, identification documents, certificates and licenses, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices such as Kinegrams™, and also devices which make use of focusing elements such as lenses, including moiré magnifier devices, integral imaging devices and so-called lenticular devices.

Diffractive security devices such as holograms and Kinegrams™ have a number of benefits including the ability to generate strong and distinctive visual effects whilst being very difficult to replicate without specialist equipment. Nonetheless, new security devices and effects are necessary in order to stay ahead of counterfeiters' ability to imitate existing designs.

In accordance with the present invention, a diffractive security device is provided comprising first and second diffractive structures defined in a carrier layer, the first diffractive structure being a diffractive zone plate structure of a continuously curved surface configured such that when the device is illuminated by on-axis light a first diffraction pattern generated by the first diffractive structure can be viewed from at least a first side of the device at substantially all viewing angles, the first diffraction pattern exhibiting a reference point or reference line relative to which other features of the first diffraction pattern appear to move when the viewing angle is changed; and the second diffractive structure being an off-axis diffractive structure configured such that when the device is illuminated by on-axis light a second diffraction pattern generated by the second diffractive structure can be viewed from at least the first side of the device at at least some off-axis viewing angles, wherein the second diffractive structure comprises a plurality of laterally offset portions, each portion of the second diffractive structure being configured such that when the device is illuminated by on-axis light the portion of the second diffraction effect generated by the respective portion of the second diffractive structure can be viewed only from a respective subset of one or more predetermined off-axis viewing angles, the respective subsets of viewing angles being different for different portions of the second diffractive structure such that when the viewing angle is changed different portions of the second diffractive device diffract light to the viewer in sequence, whereby the second diffraction effect appears to change;

wherein the device has one or more first regions in which the first diffractive structure is present but not the second diffractive structure, and the device has one or more second regions in which the second diffractive structure is present, the first diffractive structure optionally being present and combined with the second diffractive structure in the second regions, the first and second regions being interspersed with one another across the device, such that the first diffraction pattern is exhibited across the device at all viewing angles and at at least some viewing angles the second diffraction pattern appears superimposed on the first diffraction pattern and upon changing the viewing angle the second diffraction pattern exhibits a change referenced against the reference point or reference line of the first diffraction pattern.

By combining a diffractive zone plate structure with an off-axis diffractive structure in the above-described manner, the security device exhibits a new and particularly distinctive visual effect. Namely, the first and second diffraction patterns each exhibit a change upon altering the viewing angle (e.g. by tilting or rotating the device, defined below) which in itself results in a dynamic appearance which could not be copied by standard reproduction methods. Further, the stationary reference point or line of the first diffraction pattern acts to emphasise the change exhibited by the second diffraction pattern upon tilting or rotation and also demonstrates register between the two effects, resulting in strong visual integration between the two. This leads to a memorable and easily describable feature which is extremely difficult to imitate. It should be noted that, in practice, the reference point or line of the first diffraction pattern (or part of it) could fall within one of the second regions and therefore may not be visible (at least at some viewing angles). Nonetheless, its position will still be apparent by virtue of the features of the first diffraction pattern which move around it upon tilting or rotation.

As will be appreciated by those familiar with diffractive devices, the term "zone plate structure" refers to a Fresnel-type arrangement of alternating bands of either high and low optical density (in a device operating on the principle of amplitude-difference) or high and low surface relief (in a device operating on the principle of phase-difference). In contrast to Fresnel structures with a high reflection efficiency, which typically give the appearance of a three-dimensional surface such as a mirror or lens, diffractive zone plate structures as used in the presently disclosed device have a low reflection efficiency (achieved inter-alia by appropriate sizing of the structure, e.g. having band-to-band spacings comparable to the wavelength of visible light, that is preferably less than 10 microns and more preferably less than 5 microns) and hence do not reconstruct an image of a 3D surface when viewed. Rather, different wavelengths are diffracted to different positions, resulting in a diffraction pattern which appears as a two-dimensional multi-coloured pattern, e.g. of spots of different colours, or "spread out" colours (when viewed under multi-chromatic illumination such as white light). It should be noted that zone plate structures are examples of "on-axis" diffraction structures and the first diffraction pattern will be visible at nearly all viewing angles (excluding highly oblique angles at which the device may act as a planar reflecting surface as will be the case for most diffracting structures). For example, the first diffraction pattern is preferably visible at tilt angles (θ) from zero to at least 30 degrees in all azimuthal directions, more preferably from zero to at least 60 degrees, and most preferably from zero to at least 85 degrees.

Nonetheless, the diffractive zone plate structure itself is still generated based on a 3D surface and the nature of that surface will dictate the lateral shape of the bands (i.e. their shape in plan view, viewed along the normal to the device). For example, a zone structure of a hemi-sphere or another circular-based dome will comprise a series of concentric, circular bands centred on a point corresponding to the centre of the hemi-sphere. In the resulting diffraction pattern, a fixed reference point corresponding to the same centre position will be visible, other features of the diffraction pattern appearing to move relative to that reference point when the viewing angle is changed. In another example, a zone structure of a semi-cylinder will comprises a series of straight, parallel bands on each side of a straight line corresponding to the long central axis of the cylinder. This will result in an invariant reference line in the same position in the diffraction pattern, on each side of which the multi-coloured pattern will be visible and appear to move. In still further examples, the continuously curved surface on which the zone plate structure is based could be an ellipsoid, in which case the bands would be concentric ovals and there may be two reference points (at the two focus points of the ellipse), or a toroid, in which case the reference line will be curved (e.g. a circle). The continuously curved surface could alternatively comprise just a portion of any of the above shapes (e.g. an arc of a toroid), or could comprise two or more curved surfaces adjacent one another (e.g. a first semi-cylinder with its axis in a first direction adjacent a second semi-cylinder with its axis in a second, e.g. perpendicular, direction—in which case there will be two reference lines, one in each part of the device).

It should be appreciated that the above-described three-dimensional shapes will not be visible from the device but their selection will determine the nature of the first diffraction pattern and in particular the location and type of the reference point or line. In general, any continuously curved surface can be utilised, the only requirement being that the gradient of its surface changes continuously (i.e. there are no flat/planar portions of the surface—or if such portions exist they are not represented in the zone plate structure, e.g. they fall outside the bounds of the first diffraction structure and, preferably, of the whole device). If the diffractive structure is generated holographically, the curved surface in question will be used directly to produce the light interference pattern which is recorded and developed resulting in the first diffractive structure. In other cases, the curved surface may be used in a mathematical model to determine the light interference pattern that would result from it and then the corresponding structure can be formed based on the output of the model, e.g. using an optical fringe writer or electron beam lithography.

The off-axis diffractive structure forming the second diffractive structure could comprise any diffractive structure other than a zone plate structure. For example, the off-axis diffractive structure could comprise one or more off-axis holograms or, as described in more detail below, one or more diffraction grating structures. The second diffraction pattern (exhibited by the second diffraction structure as a whole) need not be exhibited at all viewing angles, although in preferred cases at least a portion of it will be visible at substantially every viewing angle (though preferably not the name portion). The second diffraction structure comprises a plurality of different portions which are laterally offset from one another (i.e. cover different areas of the device). The portions may abut one another or may be spaced from one another, or there may be a mixture in which some abut one another whilst others are spaced away. In at least some of the portions, the second diffractive structure will be different in each respective portion, but there may be more than one portion in which the diffractive structure is the same (in which case those portions will exhibit the same effects as one another at each viewing angle).

The diffractive replay from each portion of the second diffractive structure will only be visible across a respective subset of viewing angles, which subset is preferably different for each of the different portions (although the subsets may optionally partially overlap one another). This has the result that, at any one viewing angle, the appearance of the second diffraction pattern is different in each of the different portions—for instance, various portions may exhibit different colours from one another and/or appear "on" (i.e. diffract light to the viewer) or "off" (i.e. diffract no light to the viewer). As the viewing angle is changed, e.g. by tilting and/or rotation of the device, the appearance of each portion changes, e.g. in terms of colour and/or whether it is "on" or "off", giving rise to the overall change in the second diffraction pattern mentioned at the outset, which can be compared against the fixed reference point or line of the first diffraction pattern. For example, the second diffraction pattern may appear to undergo a progressive change in colour, moving across the portions relative to the reference point or line, and/or the second diffraction pattern may appear to change in terms of shape, size and/or position relative to the reference point or line, by virtue of its different portions turning "on" and "off".

The various portions of the second diffractive structure are arranged in a plurality of second regions of the device, the second regions being interspersed with first regions in which only the first diffractive structure (the Fresnel zone plate) is present. In many preferred cases there will be a one-to-one correspondence between the second regions and the portions of the second diffractive structure, i.e. each second region will contain just one portion of the second diffractive structure. That is, each of the second regions of the device may correspond to a different one of the plurality of portions of the second diffractive device. However this is not essential and one or more of the second regions could be made up of two or more (abutting) portions of the second diffractive structure. By providing the second diffractive structure in the spaced second regions only and arranging the first diffractive structure therebetween, both of the first and second diffraction patterns are exhibited across the device as a whole, i.e. both appearing to occupy the same overall area rather than being positioned side-by-side. That is, the second diffraction pattern will appear laterally inside the periphery of the first (at least partially) and vice versa. The two effects appear superimposed on one another, at least on a large scale. Preferably, the second regions collectively cover 50% or less of the total area of the security device.

In some cases, only the second diffractive structure will be present in each second region (i.e. the first diffractive structure will be absent in the second regions). However, since each second region should be large enough to be individually distinguished by the naked eye, this has the result that the second regions will not exhibit the first diffractive effect at any viewing angles.

Therefore, at viewing angles at which the second diffractive effect is not visible from the second region in question (i.e. it appears "off"), the second region appears as a gap or artefact interrupting the first diffraction pattern which will be exhibited by the first regions on either side (since the first diffraction pattern is visible at all viewing angles). This is undesirable and so in more preferred embodiments, both the first and second diffractive structures will be present and combined with one another in each second region, to thereby reduce this effect. Various manners in which this can be achieved will be discussed further below.

Preferred features of the disclosed device will now be described.

As already mentioned, the first diffractive structure could operate on differences in amplitude of light transmitted through the carrier or on differences in phase of the light. Hence, the diffractive zone plate structure preferably defines a series of alternating maxima and minima lines (i.e. the "bands" referred to above) which in the case of an amplitude difference zone plate structure correspond to locations of relatively high and relatively low opacity of the carrier layer, respectively, and in the case of a phase difference zone plate structure correspond to locations of peaks and troughs, respectively, in a surface relief of the carrier layer, the distance of the $n^{th}$ maxima line from the reference point along any one direction or from the reference line along the orthogonal direction being approximately proportional to the square root of n. Thus, as the distance from the reference point or line increasing, the spacing between each adjacent pair of maxima lines (bands) decreases. It should be noted that the proportionality constant may be the same in all directions (as would be the case in a circular zone plate structure), or could vary (e.g. in an elliptical zone plate structure).

In particularly preferred examples, the distance of the $n^{th}$ maxima line from the reference point along any one direction or from the reference line along the orthogonal direction is defined by the expression:

$$r_n = \sqrt{\left(n\lambda f + \frac{n^2\lambda^2}{4}\right)}$$

where n is an integer, $\lambda$ is the wavelength of light and f is a constant. The value of $\lambda$ is selected according to which wavelength(s) of illumination the pattern is to be viewed under. Hence the value of $\lambda$ should fall within the visible light spectrum, e.g. between about 390 to 700 nm. In preferred examples a value of around 550 nm is selected since this represents an approximate average of visible light wavelengths. Again in a circular-based device the same expression above will apply in all directions emanating from the reference point (i.e. "r"=radius), but in other devices the values of the constants A and f may differ. The above expression approximates to $r_n=\sqrt{(n\lambda f)}$ for $f \gg \lambda$. The preferred value of f (which represents the focal length of the structure, if it were acting as a lens or mirror) is a matter of choice to the skilled man. In simple terms the focal length f represents the forward and reverse "depth" of the device. If the focal length f is much greater than half the lateral dimension of the optically active region of the security device then the forward and reverse focal spots (the bright regions discussed below) will swing outside the dimensions of the device as the viewing position moves away from the device normal. Conversely if the focal length is much less than half the lateral dimension of the optically active region of the security device then the sense of forward and reverse depth will be diminished.

Therefore it is preferred that the focal length f is similar in value to or less than half the lateral dimension of the optically active region of the security device. For example, for a security device with an optically active region of 30 mm in diameter, then suitable ranges for the focal length f would be between 10 mm and 30 mm. The choice of 10 mm will result in focal spots (bright regions) which remain within the dimensions of the device at even the most oblique viewing angles (greater than 75 degrees) but with a perceived forward and reverse depth noticeably less than the dimensions of the device, whereas 30 mm will give twice the perceived forward and reverse depth but the focal spots will swing or move out of view for viewing angles greater than 45 degrees.

It should be noted that the focal length f will vary with wavelength giving rise to chromatic aberration. For example, for a focal length at a wavelength of light of 550 nm (the centre of the visible spectrum) of 15 mm, then the focal length for red light (630 nm) will be about 13 mm and similarly for blue light (450 nm) it will be about 18 mm.

The variation between maxima and minima can follow profiles of various different shapes. Preferred examples include profiles which are substantially sinusoidal, square-wave or triangular, the angle of one face of each triangular maxima or minima increasing with distance from the reference point or line. However, substantially sinusoidal profiles are particularly preferred since this results in reduced diffraction efficiency which increases the spread of colours in the first diffraction pattern and therefore enhances the multi-coloured appearance of the device since each colour can be distinguished more clearly by the naked eye. It will be appreciated that where the structure is formed as a surface relief, the profile will correspond to the physical shape of the relief structure (i.e. that of the peaks/troughs, which will preferably be sinusoidal) whereas where the device is based on amplitude it will be the variation in optical density from one point to another which exhibits the (preferably) sinusoidal nature.

In particularly preferred examples, each maxima is spaced from the next by 10 microns or less, preferably 5 microns or less. Of course, this spacing will vary across the device but preferably falls within the above limits throughout.

Where the diffractive zone plate structure is an amplitude-difference zone plate structure, the maxima and minima bands can be formed by various different techniques, including demetallisation of the carrier. That is, maxima bands may carry a layer of metal (and hence have a high optical density), whilst the metal layer is absent in the minima bands (which therefore have a lower optical density). Some suitable methods of achieving a demetallised pattern with the necessary high resolution for this purpose are disclosed in US-A-2009/0317595. Amplitude-difference diffraction structures formed in this way are particularly difficult to counterfeit due to the complex technology involved, and therefore possess a particularly high level of security.

However, in many cases, it is especially preferred that the diffractive zone plate structure is a phase difference zone plate structure formed as a surface relief in the carrier layer, the diffractive security device preferably further comprising a reflection enhancing layer following the contours of the surface relief on the carrier layer. This enables large numbers of the device to be manufactured by replication of the appropriate surface relief, e.g. by embossing or cast-curing as discussed further below. In addition, forming the first diffraction structure as a surface relief lends itself particularly well to arranging the first and second diffractions structures in the respective regions of the device alongside one another, and, in preferred embodiments, to combining the two structures, since the second diffraction structure can also be formed as a surface relief. The reflection enhancing layer could be a layer of one or more metals or metal-alloys (opaque or semi-transparent), preferably aluminium, copper, nickel or any alloy of one or more of the same, or could be a material with a different refractive index from that of the carrier layer (commonly termed a high refractive index or "HRI" material), such as ZnS. HRI layers have the advantage that many are visually transparent, with the result that the diffraction effects can be viewed whilst simultaneously seeing through the device.

Advantageously, the profile depth (i.e. peak to trough distance) of the surface relief defining the first diffractive structure is no greater than 1 micron, preferably no greater than 0.5 microns.

As discussed above, the change exhibited by the second diffractive structure could take various different forms. In some preferred embodiments, the second diffractive structure is configured such that, upon a change in viewing angle, at least some of the portions thereof exhibit a change in the colour of the diffracted light directed to the viewer, the change in colour occurring progressively from one portion to the next such that the diffracted colours of the second diffractive structure appear to move relative to the reference point or line of the first diffraction pattern. For instance, the shape, size and location of the second diffraction could remain constant across different viewing angles but its colour will change, e.g. appear to move in bands across the device. For example, at one angle a certain portion could appear blue and upon tilting the blue colour may appear to move from one region to the next, followed by a band of another colour, and so on.

In other preferred embodiments, the second diffractive structure is configured such that, upon a change in viewing angle, at least some of the portions thereof direct diffracted light to the viewer in turn, the second diffraction effect becoming visible in each of the plurality of second regions in the same sequence as the order in which the second regions are spatially arranged on the device, such that the location and/or extent of the second diffraction pattern appears to move relative to the reference point or line of the first diffraction pattern. In other words, different portions of the second diffractive structure appear to turn "on" and "off" as the viewing angle is changed. It may be the case that each portion switches "off" at the same point of tilt as its neighbouring portion switches "on", or the angles over which they appear "on" could partially overlap resulting in a more gradual sense of movement. The resulting animation could appear as a change in size or shape (i.e. "extent") of the second diffraction pattern and/or as a change in location, i.e. movement.

The change could also comprise a combination of the above two effects, i.e. the second diffraction pattern could change in location and/or extent whilst also exhibiting a colour change. In some cases, the type of change may depend on the type and/or direction of viewing angle movement. It is particularly desirable that the second diffractive device should exhibit a change upon rotating the device (i.e. a change in azimuthal angle), since this can be used to "track" the appearance of the first diffraction pattern upon rotation. A similar change to that exhibited on rotating will typically also be exhibited when the device is tilted in one direction, usually left-right. It is preferred but not essential that the second diffractive device may exhibit a change upon a tilting in a second direction, e.g. up-down. In some examples the device may exhibit a change in location and/or extent upon either tilting about one axis, and a change in colour upon tilting about a different, perpendicular axis. A particular example of this will be given below. More generally, the second diffractive structure can be configured such that the second diffraction pattern appears to change upon tilting and/or rotation of the viewing angle. Throughout this disclosure, "tilting" refers to a change in the angle between the viewing direction and the normal to the device, e.g. moving from a plan view of the device to an oblique angle would involve tilting. "Rotation" of the viewing angle refers to maintaining the device in a constant plane and turning it about a rotation axis corresponding to the normal to the device. During normal handling, it is common for a change in viewing angle to involve both tilting and rotation although it is also straightforward for a user to perform only tilting or only rotation to check how the device behaves in each circumstance.

In most preferred examples, every portion of the second diffractive device will be visible over only a subset of the available viewing angles—that is, each portion will appear "off" at at least one angle of view (although this angle will be different for different portions). However, in other preferred embodiments, the second diffractive device could also include at least one portion which directs diffracted light to the viewer at substantially all viewing angles. It is particularly advantageous if this static portion is designed to visually co-operate with or complement the reference point or line of the first diffraction pattern, e.g. being centred on it or having the same directionality (if any exists).

Whilst the second diffractive structure can take various forms as mentioned above, in an especially preferred embodiment, each of the plurality of portions of the second diffractive structure comprises a diffraction grating structure, the parameters of the diffraction grating structure in each portion being different, preferably the pitch of the diffraction grating structure and/or the orientation of the diffraction grating structure being different in each portion. This construction enables a high level of control over the direction and angular spread of the diffracted light exhibited by each portion, enabling the formation of complex designs which will replay reliably as intended. In particularly preferred implementations, the portions of the second diffraction structure are arranged in the second regions of the device such that the grating parameters change progressively from one second region to the next in the same sequence as the order in which the second regions are spatially arranged on the device. This has the result that as the viewing angle is changed, neighbouring second regions exhibit a colour change, or switch "on" and "off" in the same sequence as the order in which they are arranged across the device, giving rise to the appearance of motion.

Changing the pitch of a diffraction grating (i.e. the spacing between two of its adjacent maxima) changes the angular spread between the various wavelength of diffracted light, which has the result that gratings of different pitches will appear different colours from one another at any one viewing angle (all other parameters being equal). Hence in preferred embodiments, at least some of the diffraction grating structures in the respective portions have different pitches from one another, each pitch lying in the range 0.5 microns to 10 microns, preferably 1 micron to 3 microns. (Greater changes in grating pitch are not beneficial as the second order diffraction from the longer pitch gratings will replay at the same angles as the shorter pitch gratings) Advantageously, the different pitches of the respective portions may be evenly spaced across the selected range, for instance the smallest-pitch portion may have a pitch of 1 micron whilst the largest-pitch portion has a pitch of 3 microns whilst other portion have pitches at constant intervals, such as 0.1 or 0.5 microns intervals (e.g. the portions have respective pitches of 1 micron, 1.5 microns, 2 microns, 2.5 microns and 3 microns). Preferably the portions are spatially arranged across the device in order of increasing pitch so that the colour change is progressive across them upon changing the viewing angle.

In some preferred embodiments, at least some of the diffraction grating structures in the respective portions have different orientations from one another in the plane of the device, including at least two diffraction grating structures in respective portions with orientations differing from one another by substantially 90 degrees and preferably one or more diffraction grating structures in respective portions with intermediate orientations. The orientation of the grating controls the direction in which the incident light is diffracted and hence having gratings of different orientation will lead to the different portions appearing active and inactive at different angles of view. Advantageously, the orientations of the various portions vary by a substantially constant angular interval. For example, where the orientation varies across four portions, taking the orientation of the first portion to correspond to zero degrees, the other portions may have orientations of 30 degrees, 60 degrees and 90 degrees respectively. Preferably the portions are spatially arranged across the device in order of increasing angle so that the portions turn "on" and "off" progressively across the device upon changing the viewing angle.

The device may comprise a mixture of parameter variations. For example, some portions could vary only in grating pitch from one to the next whilst others may vary only in grating orientation, or the portions could vary both in pitch and orientation.

The second diffraction structure is preferably configured in such a way as to clearly demonstrate its register to the first diffraction structure. For example this can be achieved by the second diffraction pattern visually co-operating with, and preferably emphasising, the reference point or line of the first diffraction pattern.

Therefore in particularly preferred embodiments, the second regions of the device are arranged so as to define indicia or a pattern which surrounds, and preferably is centred on, the reference point or line of the first diffraction pattern. For example, the second regions (interspersed with the first regions) may preferably extend across an area of the device which includes the reference line or pattern, advantageously at its centre or at another distinctive location in the design of the second diffraction pattern.

In a particularly preferred implementation, the second regions of the device comprise a series of concentric outlines (which may be complete or partial, e.g. formed of broken lines or dots), spaced from one another by first regions of the device, each second region surrounding the reference point or line of the first diffraction pattern, the second diffraction structure being configured such that upon a change in viewing angle the second diffraction pattern appears to change towards or away from the reference point or line, preferably such that the extent of the second diffraction pattern appears to contract or expand about the reference point or line upon a change in viewing angle. The outlines could be of a regular geometric shape such as a circle, hexagon or square, or of an alphanumeric character or of any other indicia or graphic, e.g. the outline of a silhouette portrait. Advantageously, each concentric outline comprises a respective portion of the second diffraction structure comprising a diffraction grating structure with different grating parameters, preferably the pitch of the diffraction grating structure and/or the orientation of the diffraction grating structure being different in each portion. In this way, applying the principles described above, the various outlines can be made to appear and disappear upon tilting, so that the indicia represented by the outlines appears to expand or contract, and/or to change in colour in a progressive manner towards or away from the centre. Preferably, the second regions collectively cover 50% or less of the total area of the security device inside the largest concentric outline. This low "fill factor" ensures that a substantial area of the device displays the first diffraction pattern (the Fresnel pattern) so that this remains visible across the device.

In another preferred implementation, the second regions comprise at least two spaced areas each defining different respective parts of the indicia or pattern and the second diffractive structure is configured such that different ones of the at least two spaced areas direct diffracted light to the viewer at different viewing angles whereby different parts of the indicia or pattern are visible as the viewing angle is changed, wherein preferably at at least one viewing angle all parts of the indicia or pattern are simultaneously visible. The various spaced areas could be "nested" inside one another and/or arranged side-by-side (or a mixture of the two).

In cases where the first diffraction pattern exhibits a reference line (as opposed to a reference point), preferably the second regions are spaced along the reference line or parallel to the reference line, the second diffractive device being configured such that, upon a change in viewing angle, the second diffraction pattern appears to change in a direction parallel to the reference line. This configuration helps to emphasise the integrated nature of the two diffractive devices, and the register between the two.

Where the second diffraction structure comprises a plurality of diffraction gratings, in an especially preferred implementation, each second region comprises a respective portion of the second diffraction structure, each portion comprising a diffraction grating structure with different parameters, the pitch of the diffraction grating structure in each second region changing according to the distance of the second region from the reference point or line of the first diffraction pattern and the orientation of the diffraction grating structure in each second region varying according to the position of the second region along a direction having constant distance from the reference point or line of the first pattern. For example, where the first diffraction pattern is based on a hemisphere or other circular dome, such that it exhibits a reference point, the regions of the second diffraction structure can be configured to change in their grating pitch according to the radial distance, and to change in their grating orientation in the circumferential direction (which is perpendicular to the radial direction). This leads to particularly strong visual effects since when the device is tilted about a first axis, the regions will exhibit a change in colour which appears to move towards and away from the reference point (and which may also involve regions turning "off" and "on", resulting in an expansion/contraction effect), whilst when the device is tilted about a second axis perpendicular to the first, the regions appear to turn "on" and "off" in sequence along the circumferential direction, giving the appearance that the second diffraction pattern is rotating about the reference point. Similar effects can be created where the first diffraction pattern is non-circular. For example, where a reference line exists rather than a point, the colour change will appear to take place towards and away from the reference line upon tilting about the first axis, whilst tilting about the second axis will result in apparent movement along the direction of the reference line.

Preferably, the second diffraction structure is configured such that, at substantially every viewing angle the second diffraction structure in at least one of the second regions directs diffracted light to the viewer. This ensures that at least a part of the second diffraction structure is visible no matter what the viewing angle, but it is not essential. It should be noted that this requirement is different from the preferred feature already mentioned where the second diffraction structure is configured such that in one of the second regions, the second diffraction structure directs diffracted light to the viewer at substantially all viewing angles (i.e. at least one static portion is provided).

It is desirable that each of the second regions is sufficiently large to be individually discernible to the naked eye, preferably having a minimum dimension of no less than 300 microns, more preferably 500 microns, most preferably 1 mm. Some of the second regions could be much larger, e.g. having an area of up to 1 $cm^2$.

The second diffractive device is preferably formed as a relief structure in the carrier layer, whether the first diffractive device is formed in the same manner (i.e. as a phase-difference device) or not (i.e. as an amplitude difference device). In the latter case, the relief defining the second diffractive device in the second regions can be arranged alongside the demetallised pattern (or other variation in optical density) defining the zone plate structure in the first regions.

As mentioned above, the first diffractive structure could be absent in the second regions but this will result in gaps in the first diffraction pattern meaning that, even when a part of the second diffraction pattern is not visible (e.g. because a portion of the second diffractive structure appears "off" at a certain viewing angle), the presence of the second diffractive structure will still be apparent and may appear as a "ghost" image disrupting the first diffraction pattern. This can be desirable in some cases. However, in preferred embodiments, the first and second diffractive structures are combined in the second regions and configured such that, when the device is viewed from one of the subset of predetermined off-axis viewing angles at which the second diffraction effect is visible in at least one second region, the device exhibits the first diffraction effect in the first region(s) and the second diffraction effect in the at least one second region, and when the device is viewed from a different viewing angle at which the second diffraction effect is not visible in the at least one second region, the device exhibits the first diffraction effect in the first region(s) and in the at least one second region with substantially no contrast between the first regions and the at least one second region. That is, substantially no disruption to the first diffraction pattern will be visible across the device even at viewing angles where the second diffraction pattern is not visible (in whole or in part).

This can be achieved by combining the first and second diffractive structures in the second regions in a number of ways. In a first preferred embodiment, within the or each second region of the device, the first diffractive structure is present only in a first array of elemental areas, and the second diffractive structure is present only in an second array of elemental areas, the elemental areas of the first array being interposed with the elemental areas of the second array, the elemental areas of the first and second arrays being sufficiently small so as not to be individually detectable to the naked eye. Thus the first and second diffractive structures are intermingled alongside one another on such a small scale that, whilst on a microscopic level gaps will be present in the first diffraction structure (and filled by the second diffractive structure), these will not be apparent to the human eye. In this case, within the or each second region of the device, the proportion of the surface area of the device occupied by the second array of elemental areas is preferably 50% or less, more preferably 30% or less. The lower the fill-factor of the second diffractive device, the less noticeable the effect on the first diffraction pattern. The interleaved elemental areas could take any shape but in preferred examples, the elemental areas of the first and/or second arrays are circles, ellipses, squares, rectangles, straight or curvilinear lines, or indicia such as alphanumerical characters or symbols. Advantageously, the elemental areas of the first and/or second arrays have a maximum small dimension (e.g. linewidth) of 100 microns or less, preferably 50 microns or less, more preferably 30 microns or less. The pitch of each array is preferably of a similar size, i.e. 100 microns or less, preferably 50 microns or less, more preferably 30 microns or less. This approach is suitable whether the first diffractive structure is an amplitude-difference zone plate or a phase-difference zone plate.

In other preferred embodiments, within the or each second region of the device, the first and second diffractive structures are superposed on top of one another, the second diffractive structure modifying the first diffractive structure. In other words, the first diffractive structure is not replaced or destroyed where the second diffractive structure is present. Rather, the first diffractive structure is continuous across the full device but is modified by the second structure in the second regions. For example, where the first and second diffractive structures are each formed as a surface relief in the carrier layer, the second diffraction structure preferably has a low profile depth relative to that of the first diffractive structure. Thus, the second diffractive structure can be present as a small-amplitude variation to the top of each "peak" forming the first diffractive structure.

Devices of the sort described above can be provided with additional features to further enhance their security level. For example, the device may further comprise an at least semi-opaque image layer applied over the carrier layer on one or both of its sides defining an image which is registered to the reference point or line of the first diffraction pattern. The image layer may be formed of opaque or semi-opaque ink(s) for instance, and could be applied by any printing method. It should be noted that the image layer may not be in direct contact with the carrier layer but some intermediate layer may exist (such as the reflection enhancing layer mentioned above, or a lacquer layer).

Where the first and second diffractive structures are formed as a surface relief in the carrier layer and the diffractive security device further comprising a reflection enhancing layer following the contours of the surface relief on the carrier layer, the reflection enhancing layer may preferably include one or more gaps defining an image which is registered to the reference point or line of the first diffraction pattern. For example, if the reflection enhancing layer is a metal or alloy this may be achieved through a demetallising process such as etching. Neither diffraction pattern will be visible in the one or more gaps, which will preferably appear transparent, possibly revealing a background on which the device has been placed.

Advantageously, images of the sort mentioned here (formed for instance by printing or demetallisation) should visually co-operate with the diffraction patterns to help demonstrate the register. In preferred cases, the image substantially encloses, and preferably is centred on, the reference point or line of the first diffraction pattern.

In still further preferred examples, the device further comprises at least one transparent layer containing at least one optical effect substance, preferably a visible colourant, disposed over the carrier layer on one or both sides across at least part of the device. Such a layer can be provided to change the visible colour of the device (which will also affect the colours of the diffraction patterns), and/or to introduce luminescence, fluorescence or phosphorescence, e.g. as may be activated by UV illumination. The layer may be patterned, i.e. contain different optical effect substances in different laterally offset areas of the layer, to introduce further complexity to the device. The pattern may display indicia, a graphic or the like. Again this is preferably registered to the reference point or line of the first diffraction pattern.

Depending on the construction of the device the diffraction patterns may only be visible from one side of the device, but in preferred embodiments, the construction is such that the first and diffraction effects are exhibited on both sides of the device. For example, where the diffraction structures are formed as relief in a reflective layer, the supporting layers on either side of the reflective layer may preferably be at least partially transparent so that it can be viewed from both sides.

The present invention further provides a method of making a diffractive security device, comprising forming first and second diffractive structures in a carrier layer, the first diffractive structure being a diffractive zone plate structure of a continuously curved surface configured such that when the device is illuminated by on-axis light a first diffraction pattern generated by the first diffractive structure can be viewed from at least a first side of the device at substantially all viewing angles, the first diffraction pattern exhibiting a reference point or reference line relative to which other features of the first diffraction pattern appear to move when the viewing angle is changed; and the second diffractive structure being an off-axis diffractive structure configured such that when the device is illuminated by on-axis light a second diffraction pattern generated by the second diffractive structure can be viewed from at least the first side of the device at at least some off-axis viewing angles, wherein the second diffractive structure comprises a plurality of laterally offset portions, each portion of the second diffractive structure being configured such that when the device is illuminated by on-axis light the portion of the second diffraction effect generated by the respective portion of the second diffractive structure can be viewed only from a respective subset of one or more predetermined off-axis viewing angles, the respective subsets of viewing angles being different for different portions of the second diffractive structure such that when the viewing angle is changed different portions of the second diffractive device diffract light to the viewer in sequence, whereby the second diffraction effect appears to change;

wherein the device has one or more first regions in which the first diffractive structure is present but not the second diffractive structure, and the device has one or more second regions in which the first and second diffractive structures are combined with one another, the first and second regions being interspersed with one another across the device, such that the first diffraction pattern is exhibited across the device at all viewing angles and at at least some viewing angles the second diffraction pattern appears superimposed on the first diffraction pattern and upon changing the viewing angle the second diffraction pattern exhibits a change referenced against the reference point or reference line of the first diffraction pattern.

The resulting device provides all the benefits already discussed above.

In preferred embodiments, the first and second diffractive structures are formed by:
 providing a replication tool having a surface relief defining the first and second diffractive structures; and
 using the replication tool to form the surface of the carrier layer according to the surface relief, and preferably
 applying a reflection enhancing layer onto the carrier layer so as to follow the contours of the surface relief.

The replication tool may be manufactured by creating the surface relief in a recording medium layer and preferably transferring the surface relief to the surface of the replication tool. This could be performed as part of the above process but more typically is carried out as a separate preliminary step, potentially by a different entity and/or at a different manufacturing site.

In a preferred example, the surface relief is created in a recording medium layer by forming a first surface relief structure corresponding to the first diffractive structure and then in the second regions of the device modifying or destroying the first surface relief structure by forming a second surface relief structure corresponding to the second diffractive structure. Whether the first surface relief structure is modified or destroyed by the second surface relief structure will depend on whether the first and second diffractive structures are to be combined in the second regions of the device and in what manner, as discussed previously.

The two relief structures could be made using various different techniques. Particularly good results have been achieved where the first surface relief structure is holographically generated by exposing the recording medium layer to a light interference pattern from the continuously curved surface. This results in a structure with a low diffraction efficiency and thus increased angular spread between the different colours in the diffraction pattern. In other cases, the first surface relief structure can be formed using an optical fringe writer or electron beam lithography. Such techniques can be more straightforward to implement and are also more readily combinable with formation of the second diffractive structure since the same generation methods can be used to manufacture it.

Similarly, the second surface relief structure may be holographically generated by exposing the recording medium layer to a light interference pattern from an off-axis transmission hologram. However, advantageously the second surface relief structure is formed using an optical fringe writer or electron beam lithography.

In other implementations, both diffraction structures can be physically formed in one processing step. For example, the surface relief may be created in a recording medium layer by digitally combining a first surface relief structure corresponding to the first diffractive structure and a second surface relief structure corresponding to the second diffractive structure such that in the second regions of the device the first surface relief structure is modified or destroyed and forming the surface of the recording medium layer in accordance with the combined surface relief, preferably using an optical fringe writer or electron beam lithography.

The method can be adapted to include any of the preferable features described above. Hence in one preferred embodiment the method further comprises applying an at least semi-opaque image layer over one or both sides of the carrier layer, defining an image which is registered to the reference point or line of the first diffraction pattern. For instance this can be applied using any suitable printing technique such as gravure, lithographic, offset or flexographic printing.

The method may further comprise patterning the reflection enhancing layer to form gaps defining an image which is registered to the reference point or line of the first diffraction pattern. For example where the reflection enhancing layer is metal or metal alloy, this may comprise a demetalisation process, e.g. via the use of soluble inks and/or by etching, possibly using a patterned resist.

The method may further comprise applying at least one transparent layer containing at least one optical effect substance, preferably a visible colourant, disposed over the carrier layer on one or both sides across at least part of the device. As discussed previously the layer could carry a pattern. Any suitable printing or coating technique could be employed to create the layer.

The present invention also provides a security device made in accordance with the above method.

Also disclosed is a security article comprising a security device as already described, preferably a thread, stripe, patch, foil, transfer foil or insert.

The present invention also provides a security document comprising a security device as already described, or a security article as already described, the security document preferably comprising a banknote, identity document, passport, cheque, visa, license, certificate or stamp.

Examples of security devices, methods of manufacture thereof, and their application to security documents, will now be described with reference to the accompanying drawings, in which:

FIG. 1 shows an example of a first diffractive structure suitable for use in embodiments of the invention, in plan view;

FIGS. 2(*a*), (*b*) and (*c*) show three exemplary profiles of the first diffractive structure of FIG. 1 along a radial cross-section, the profile denoting the height of the diffractive structure in one embodiment, or the transparency of the diffractive structure, in another embodiment;

FIGS. 3(*a*) and (*b*) are two images of an exemplary first diffraction pattern exhibited by a diffractive structure such as that shown in FIG. 1, under ambient illumination, at two different viewing angles;

Figure 10:
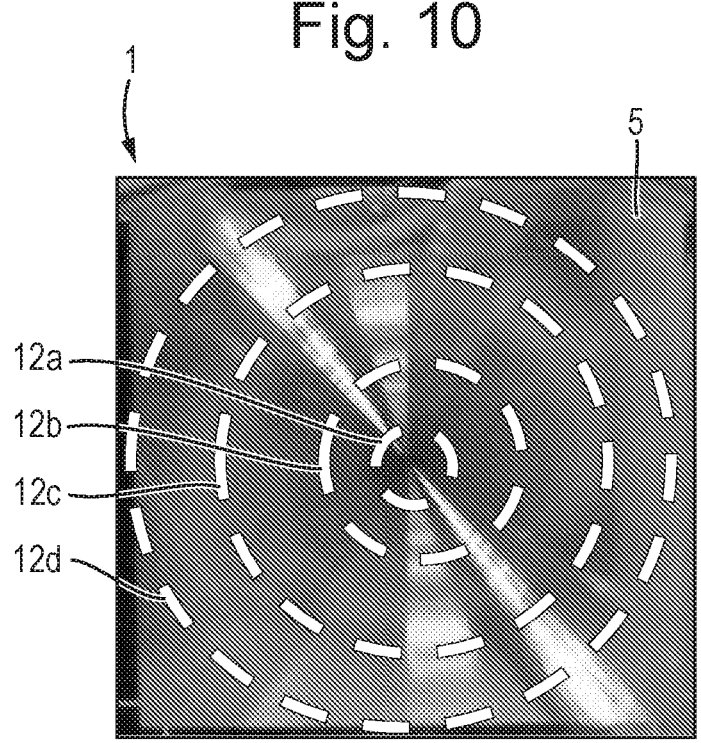
Figure 11:
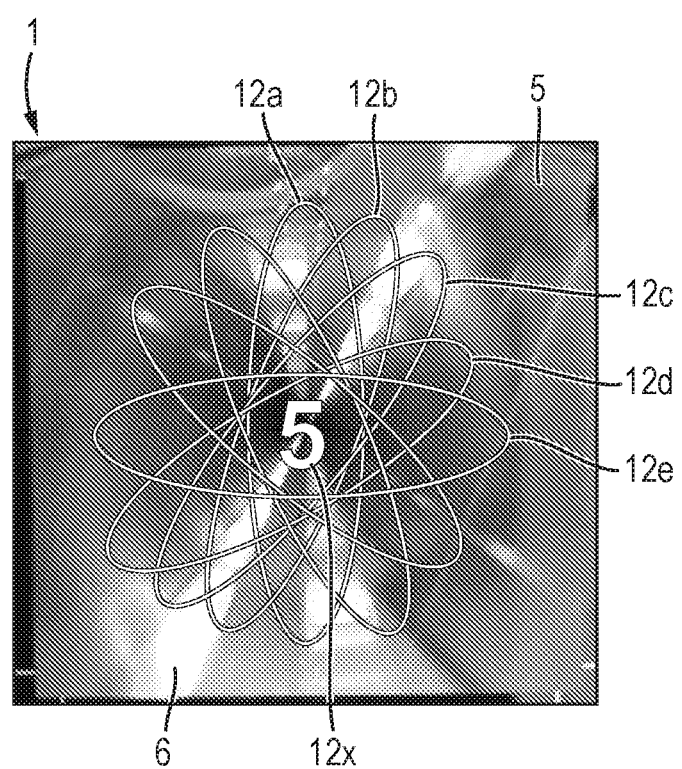
Figure 12:
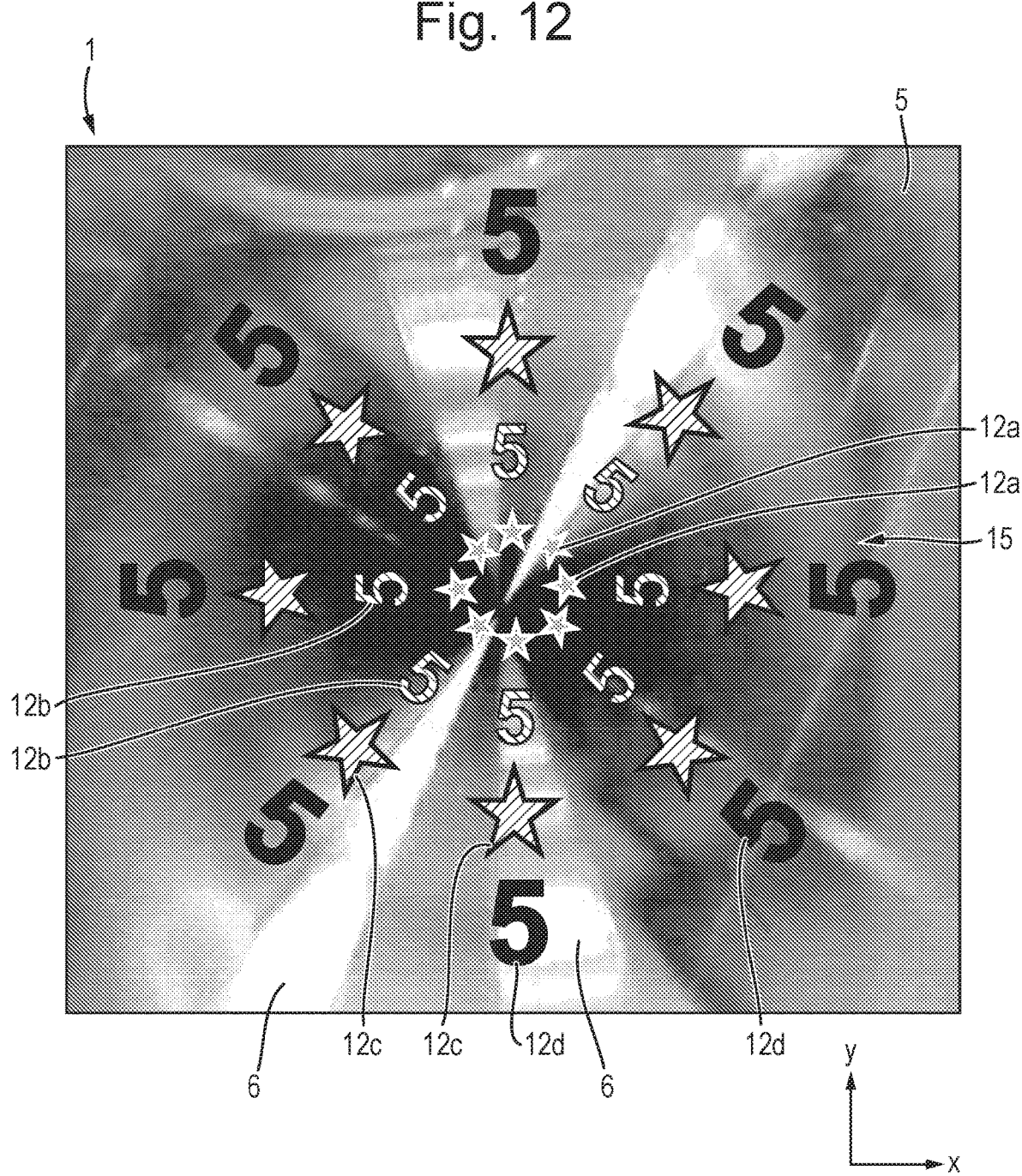
Figure 13:
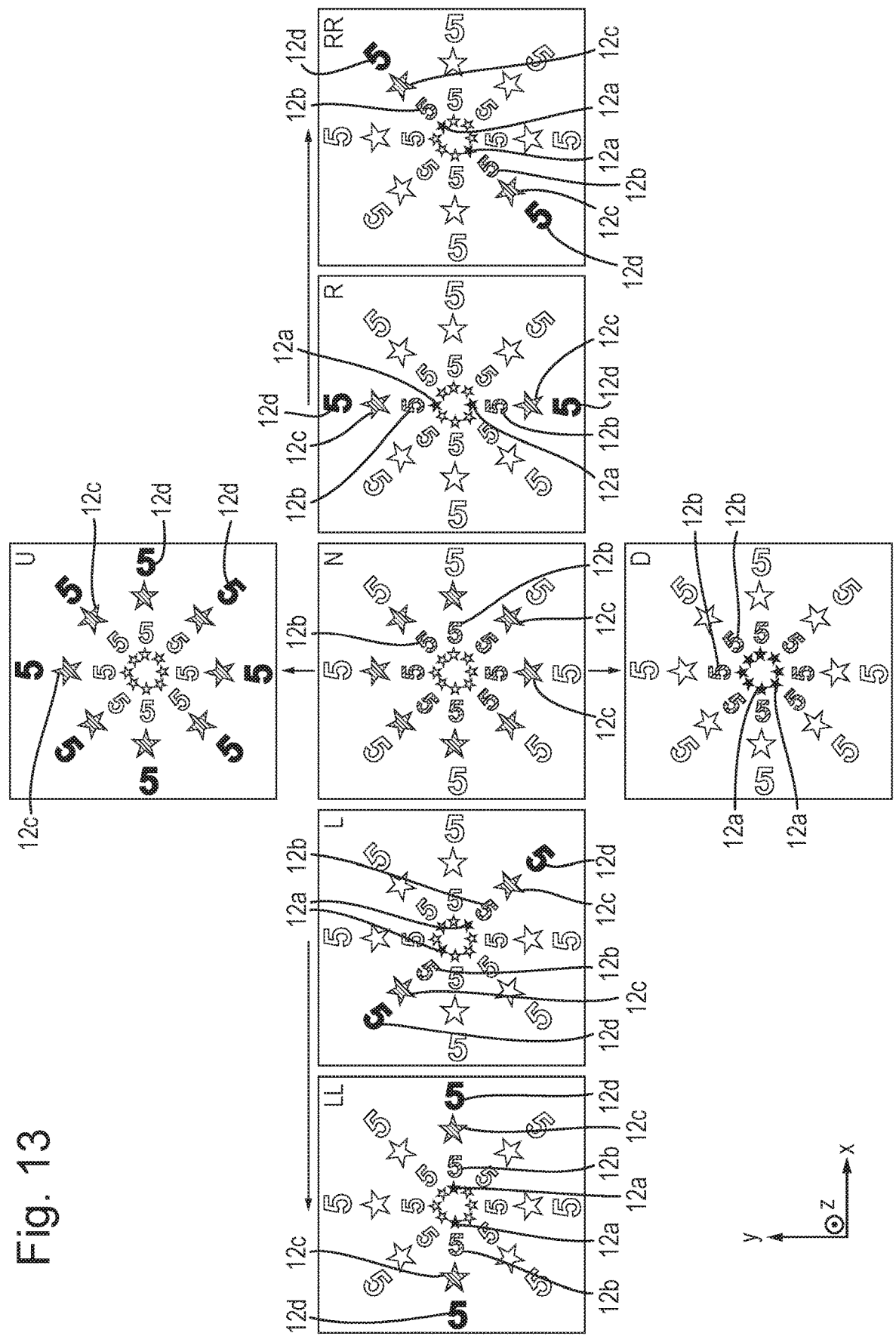
Figure 14:
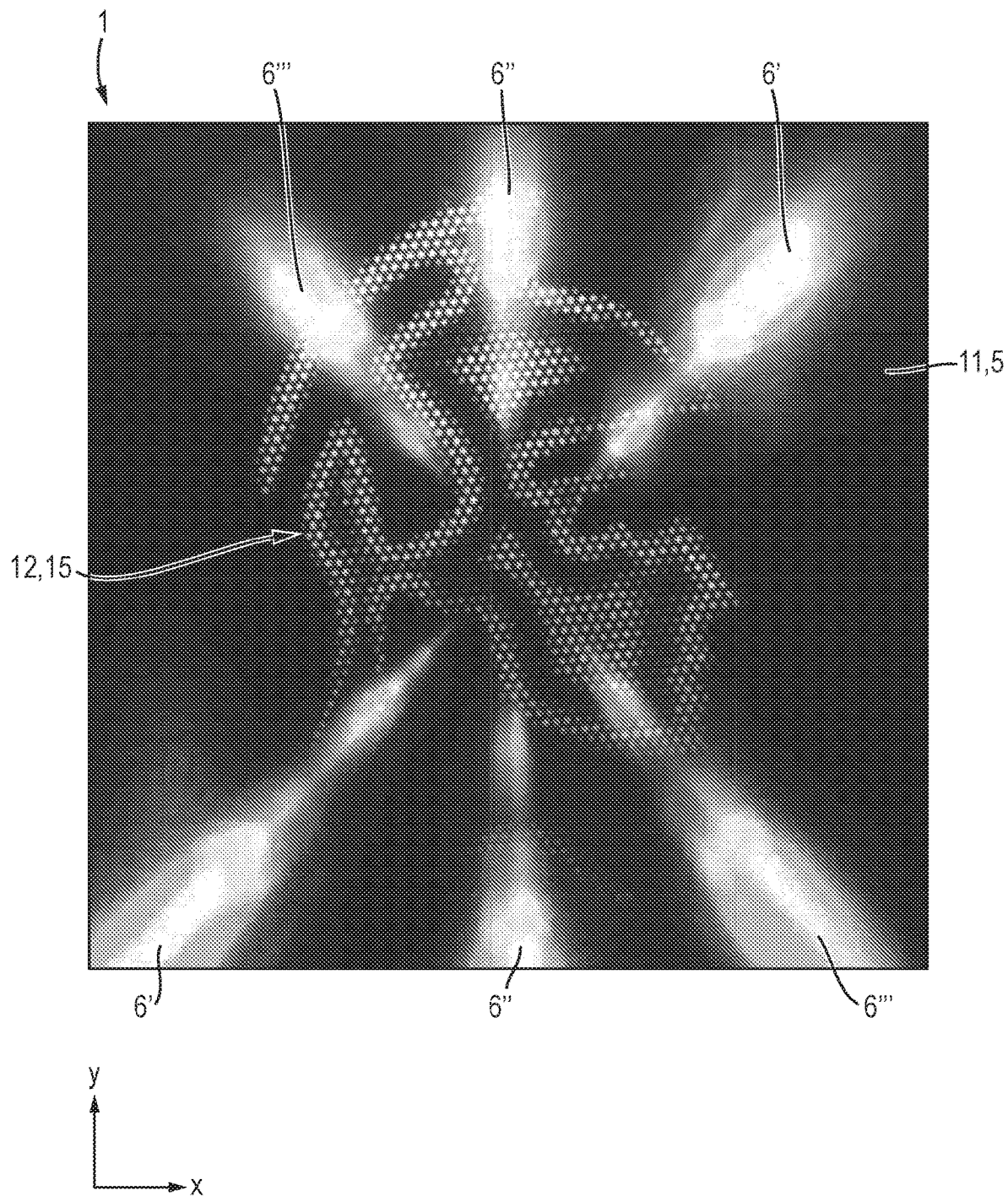
Figure 16:
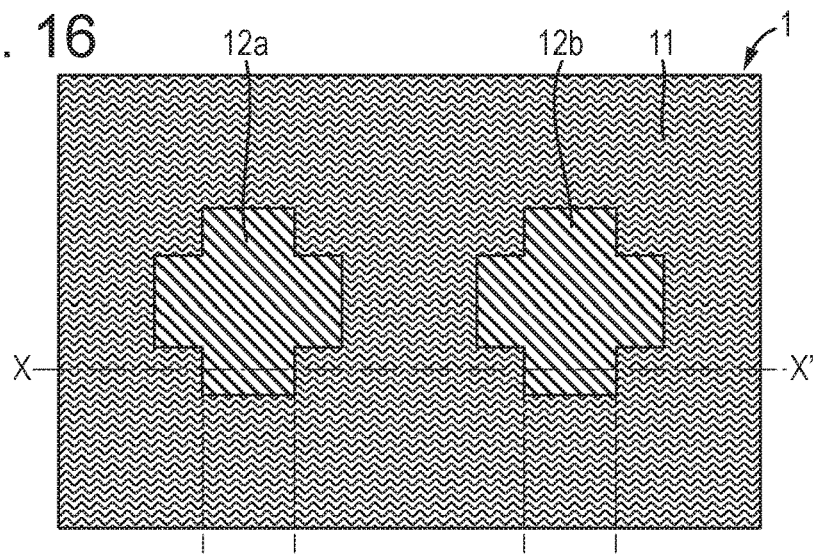
Figure 18:
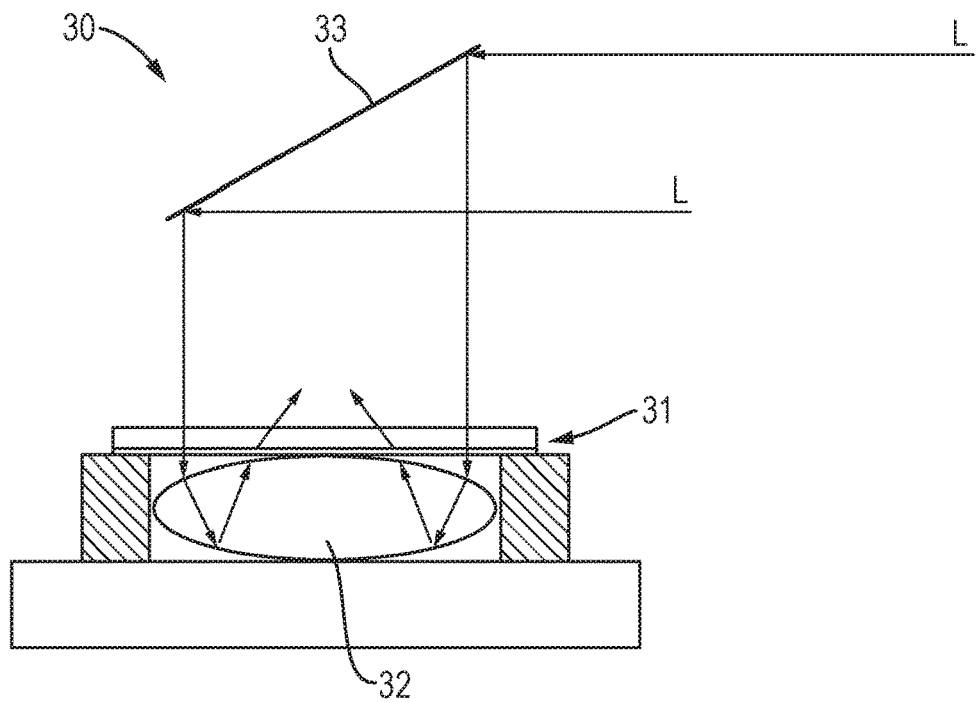
Figure 19:
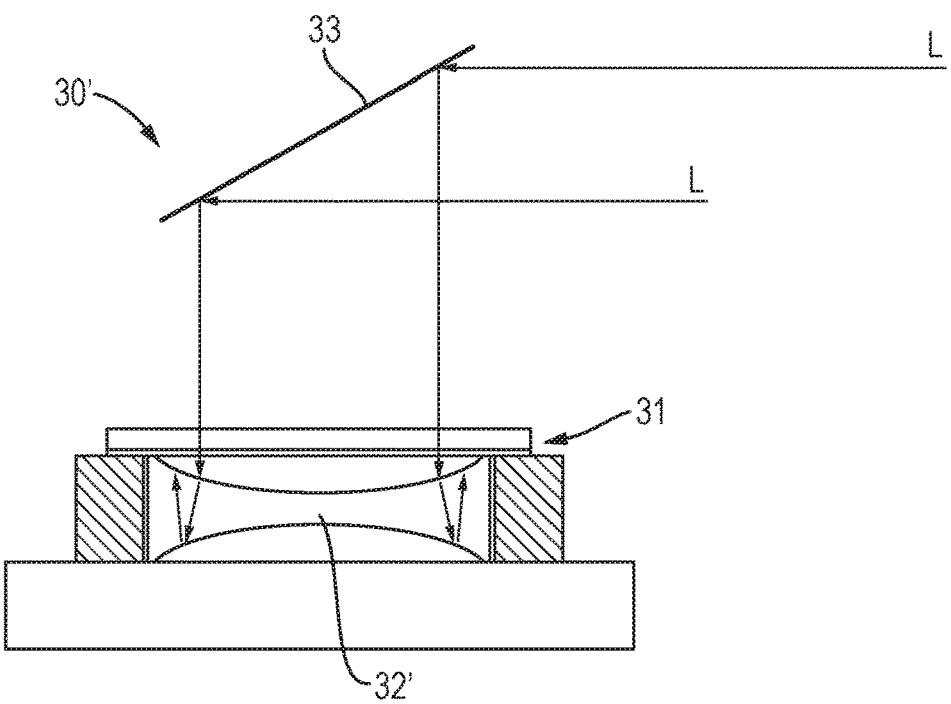

FIGS. 10 and 11 respectively show a fourth and fifth embodiment of a security device, each depicting a composite view of the respective device compiling its appearance from multiple viewing angles;

FIGS. 12 and 13 depict a sixth embodiment of a security device, FIG. 12 showing a composite view of the device compiling its appearance from multiple viewing angles, and FIG. 13 schematically showing the second diffraction pattern as viewed from various different viewing angles individually;

FIGS. 14 and 15 depict a seventh embodiment of a security device, FIG. 14 showing a composite view of the device compiling its appearance from multiple viewing angles, and FIGS. 15(*a*) to (*f*) schematically showing the second diffraction pattern as viewed from various different viewing angles individually;

FIG. 16 schematically shows an eighth embodiment of a security device in plan view;

FIGS. 17(*a*) to (*c*) show three alternative cross-sections through the security device shown in FIG. 16 along the line X-X';

FIGS. 18 and 19 show two exemplary arrangements for holographically generating a first diffractive structure;

FIGS. 20 to 23 schematically depict four exemplary techniques for forming the first and/or second diffractive structure(s);

FIGS. 24(*a*) and (*b*) show cross-sections through two further embodiments of security devices, and FIG. 24(*c*) shows a plan view of the security element shown in FIG. 24(*b*);

FIG. 25(*a*) shows a cross-section through a further embodiment of a security device and FIG. 25(*b*) shows the security device in plan view; and FIGS. 26, 27 and 28 show three examples of security documents provided with exemplary security devices.

Security devices of the sort disclosed herein comprise a first diffractive structure 2 in the form of a diffractive zone plate structure, and a second diffractive structure of a different type for which examples will be given below. Diffractive zone plates are structures comprising a series of alternate bands (i.e. maxima and minima) symmetric about a point or line, the spacing of adjacent bands decreasing with distance away from the point or line in accordance with a predetermined relationship, described further below. The bands may take the form of alternating high and low optical densities (e.g. opaque bands spaced by transparent bands), in which case the diffractive effect will operate on the principle of amplitude-difference, or physical peaks and troughs forming a surface relief, in which case the structure will be a phase-difference diffractive device. In both cases the structure will be formed in or on a carrier, such as a layer of lacquer or resin. Where the structure is formed as a surface relief on the carrier, preferably a reflection-enhancing layer (such as metal or a high refractive index material) will be applied so as to follow the contours of the relief, to improve its visibility.

Figure 1:
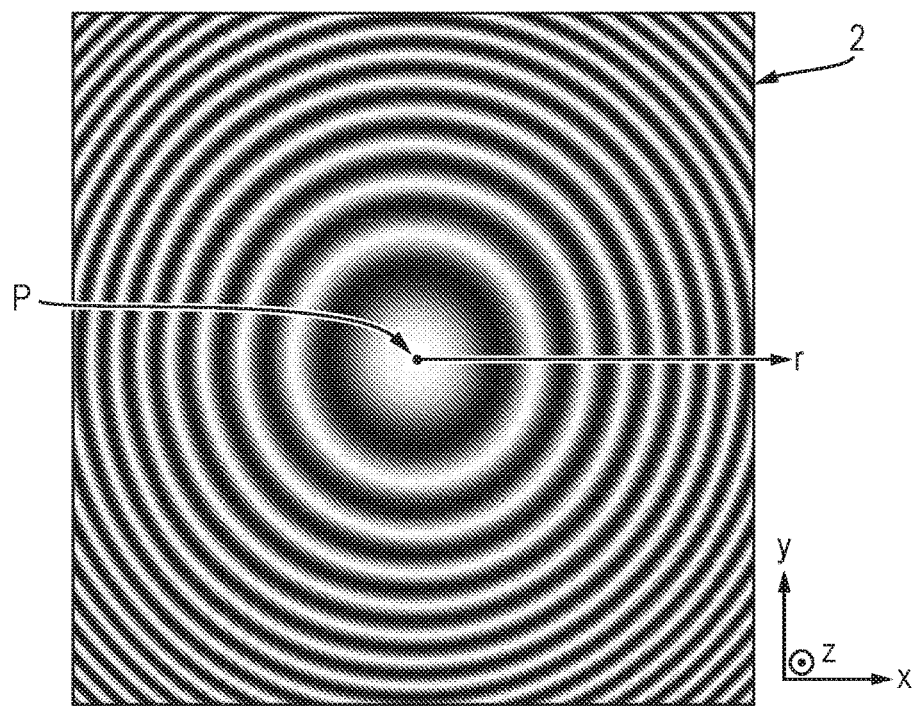

The zone plate structure is based on a three-dimensional surface and the shape of that surface will determine the lateral shape of the bands in the zone plate structure. FIG. 1 shows a first example of a diffractive zone plate structure 2 in plan view which is suitable for use as the first diffractive structure in embodiments of the invention. It will be seen that the structure comprises a series of concentric circular dark bands spaced by light bands, all centred on point P and their spacing decreasing with increasing radius r. Depending on the type of device, the dark bands may represent areas of high optical density whilst the light bands represent transparent areas, or the dark bands may represent troughs and the light bands peaks in a surface relief. A zone plate structure comprising circular bands of this sort will be generated from a portion of a spherical surface, such as a hemi-sphere, or another circular-based dome-shaped surface. In general, the zone plate structure forming the first diffractive structure in the disclosed device can be based on any continuously curved three-dimensional surface, i.e. one having a constantly changing surface gradient without any flat portions, and alternative examples will be given below. The structure should preferably continue all the way to the edge of the device, as shown.

Diffractive zone plate theory states that the distance of the $n^{th}$ band from the point P will be governed by the expression:

$$r_n = \sqrt{\left(n\lambda f + \frac{n^2\lambda^2}{4}\right)}$$

where n is an integer (n=1, 2, 3, ...), $\lambda$ is a wavelength of visible light (e.g. 550 nm) and f is a constant. Since the constant f will generally be selected to be much greater than the wavelength of light, the above expression approximates to $r_n = \sqrt{(n\lambda f)}$, i.e. the distance of each band is proportional to the square root of its number in the sequence of bands. As discussed above, in preferred embodiments the value of f is selected to be comparable to the lateral dimension of the optically active area of the device and will therefore typically be of the order of several millimetres or tens of millimetres.

If the spacing of the bands were large relative to the wavelength of light, the device would operate as a Fresnel lens or mirror through the action of geometrical refraction or reflection (i.e. not diffraction). However in the presently disclosed device, the spacing of the bands is comparable to the wavelength of visible light (preferably 10 microns or less, more preferably 5 microns or less) with the result that diffraction effects dominate and different wavelengths are redirected by the structure by differing amounts. As such, the device does not reconstruct the appearance of the three-dimensional surface on which it is based but rather exhibits a diffraction pattern of rainbow-coloured regions (assuming the device is illuminated by multi-chromatic, e.g. white, light) which, upon changing the viewing angle, appear to move relative to a fixed point corresponding to the centre P of the diffractive structure, as will be described further below with respect to FIG. 3.

Figure 2A:
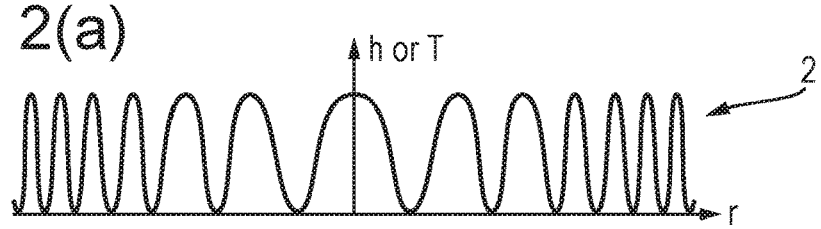
Figure 2B:
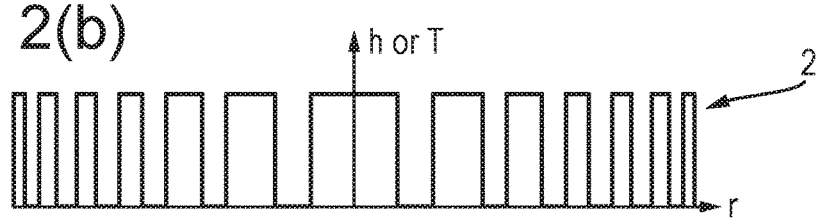
Figure 2C:
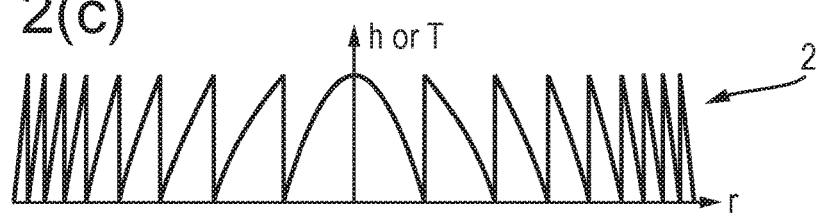

FIGS. 2(a), (b) and (c) show three alternative profiles of the zone plate structure shown in FIG. 1 along a radial direction (not to scale). The vertical axis may represent physical height h (in the case of a phase-difference device) or optical transparency T (in the case of an amplitude-difference device). It will be seen that various different profile shapes could be employed. In FIG. 2(a) the band profile is substantially sinusoidal. This is strongly preferred since this results in lower diffraction efficiency and hence greater angular spread of the different wavelengths, meaning a brighter and more colourful diffraction pattern is exhibited. However, the structure could alternatively have a square-wave profile as shown in FIG. 2(b), or a triangular profile as shown in FIG. 2(c), both of which would lead to higher diffraction efficiency such that the diffracted light will be more closely focussed. In the case of the triangular profile shown in the FIG. 2(c) it will be noted that the outer flank of each triangular "peak" is curved and its gradient increases with increasing radius r. In combination, the outer flanks of the peaks in FIG. 2(c) reconstruct the shape of the spherical surface on which the zone structure is based, as in conventional (reflective/refractive) Fresnel structures.

The ensuing description will focus on diffraction structures formed as a surface relief (i.e. phase-difference devices rather than amplitude-difference devices) since these lend themselves well to large volume replication. Exemplary methods for forming the first diffraction structure will be discussed below.

Figure 3A:
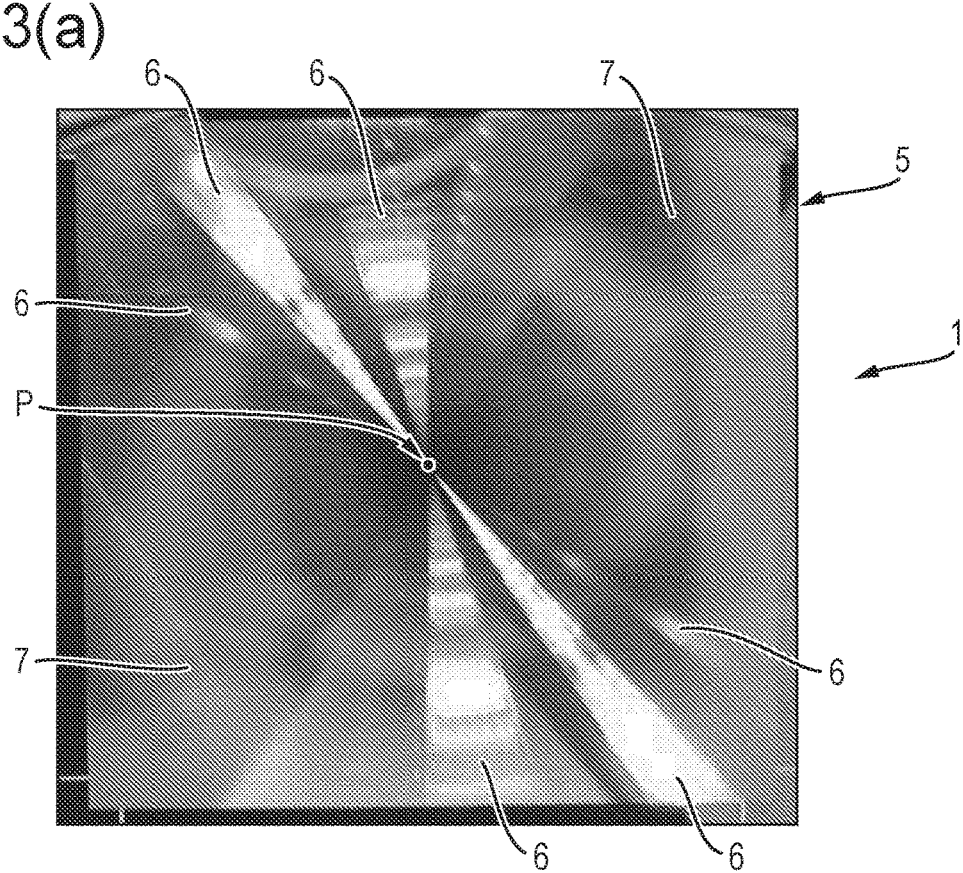
Figure 3B:
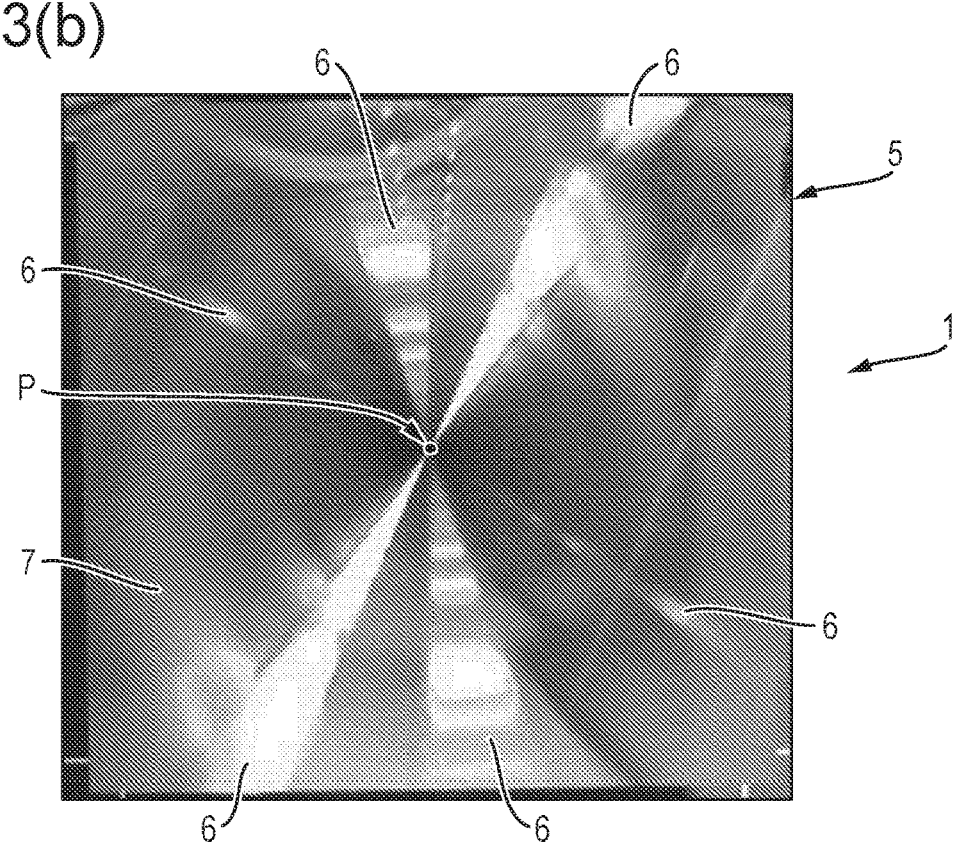

FIGS. 3(a) and (b) are images showing the appearance of the first diffraction pattern 5 exhibited by a first diffractive structure 2 of the sort shown in FIG. 1 when illuminated by white light. The first diffraction pattern will be visible at substantially all viewing angles (i.e. over essentially the whole viewing hemisphere), but its appearance will vary upon changes in tilt angle about the x- or y-axes. Thus, FIG. 3(a) shows the appearance of the first diffraction pattern 5 at a first viewing angle, and FIG. 3(b) shows its appearance at a second, different viewing angle. Since in this example the first diffraction structure is rotationally symmetric, the light image presented to the viewer will appear constant and invariant when the device is simply rotated about the z-axis (azimuthal axis) without any change in tilt angle (see FIG. 6 below for definitions of these angles), although the diffraction pattern is still moving with respect to the reference frame of the carrier. Since the device will always have some identifiable reference feature (such as a corner of the carrier, an article to which the carrier is attached or even the point at which the user is holding the device), this will be apparent as relative motion between the diffraction pattern and that reference feature since the pattern will appear to stay stationary as the object displaying it is rotated.

It will be seen that the diffraction pattern comprises one or more bright areas 6 and a background 7 which is less bright and more blurred. Whilst the Figures are necessarily shown in greyscale, it should be appreciated that the real appearance is multi-coloured, each of the bright portions 6 displaying a rainbow spectrum of different colours (possibly with multiple repeats) emanating from the point P towards the edge of the device 1. The bright portions 6 can be described as forward-projecting and reverse-projecting light beams whose boundaries trace out a spherical surface around the device with a radius equalling the constant f in the expression given above. As the viewing angle is changed, e.g. by tilting and/or rotating the device 1, the bright areas 6 appear to move relative to the point P, e.g. rotating about it and/or changing in apparent length or colour. This can be appreciated by comparing the positions of the bright areas 6 between FIGS. 3(a) and 3(b). The point P, meanwhile, remains fixed and is therefore referred to hereinafter as the reference point.

Figure 4:
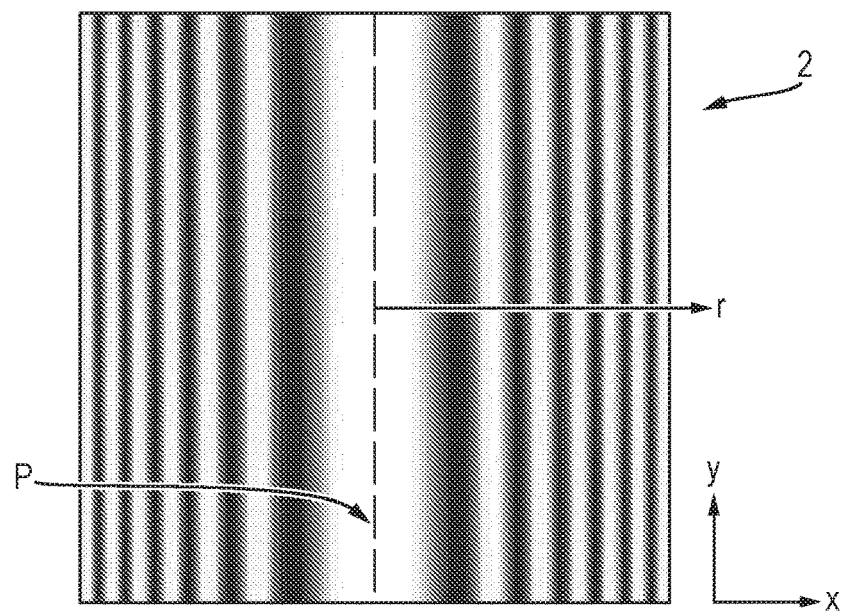
FIGS. 4 and 5 show two further examples of first diffractive structures, in plan view.

Diffractive zone plate structures based on surfaces with circular curvature, such as those depicted in FIGS. 1 and 3, are particularly preferred for use in the presently disclosed devices. However, alternative zone plate structures that could be used include those based on cylindrical surfaces, ellipsoids, toroids, or any portion thereof. FIG. 4 shows an example of a zone plate structure 2 based on a cylindrical surface, the long axis of the cylinder being aligned with the y-axis. The structure 2 comprises a series of spaced bands as before, except here they are straight and parallel to one another. The structure is symmetric about line P which corresponds to the central axis of the cylinder, and the spacing of the bands decreases with distance r from the line P in accordance with the same relationship already described above. The resulting diffraction pattern will be similar to that shown in FIG. 3 except here the bright portions 6 will appear to emanate from along the whole length of reference line P, covering rectangular or parallelogram-shaped areas of the device which vary depending on the viewing angle. Again, the line P will be discernible as a fixed line in the diffraction pattern relative to which other features of the pattern move on tilting of the device. However since the curvature of the cylinder is only in one axis, the movement will only be apparent upon tilting in the direction of the axis and not upon tilting in the perpendicular direction.

Figure 5:
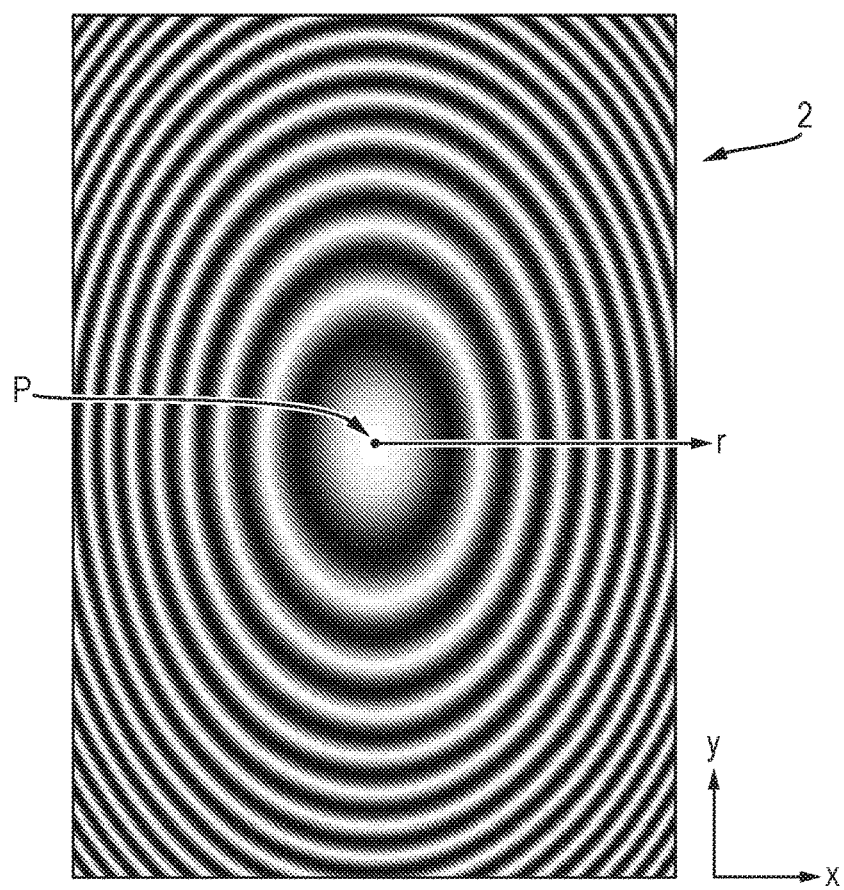

FIG. 5 shows an example of a zone plate structure 3 based on an ellipsoid, having its long axis aligned with the y-axis and its short axis aligned with the x-axis. The structure 2 again comprises a series of spaced bands in the form of concentric ellipses centred on point P. The spacing of the bands is again governed by the expression given above, but here will also vary depending on the direction of r (i.e. the constant f in the above expression will have different values along the x- and y-axes, and each direction inbetween). The resulting diffraction pattern will be similar to that of FIG. 3, except for a corresponding elliptical distortion. Again, the point P will act as a fixed reference point.

Combinations of curved surfaces could also be used, e.g. two abutting cylindrical surfaces with different directions of their long axes (preferably orthogonal directions). In this case at least one portion of the device would exhibit movement upon tilting in any direction.

Figure 6:
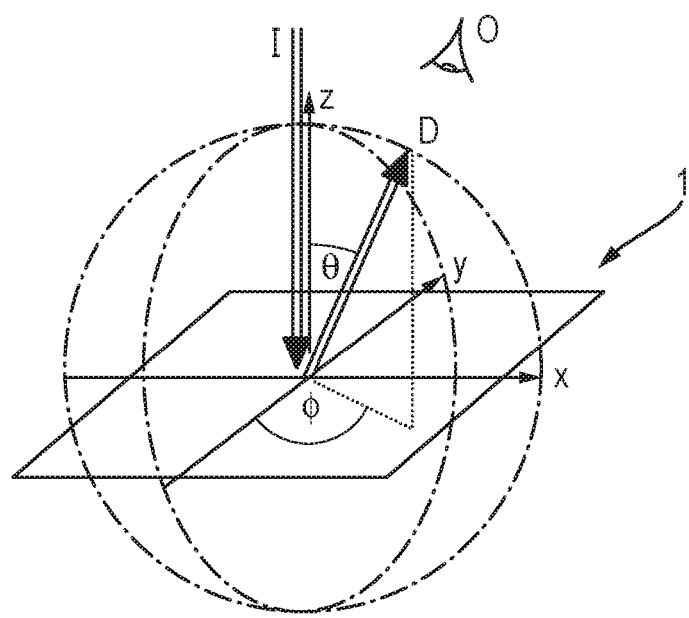
FIG. 6 shows an exemplary security device in three dimensions, to illustrate directions and angles referred to throughout the description.
Figure 7A:
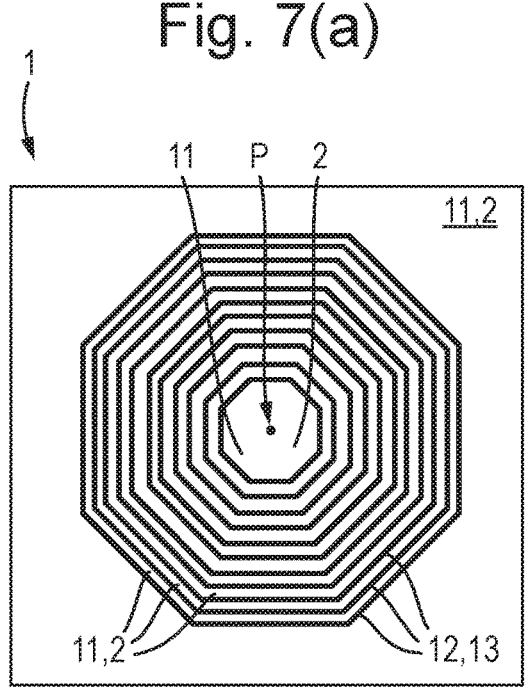
FIG. 7 depicts a first embodiment of a security device, FIG. 7(*a*) showing schematically the arrangement of first and second regions across the device, FIG. 7(*b*) showing a composite view of the device compiling its appearance from multiple viewing angles, and FIGS. 7(*c*) and (*d*) each showing a view of the device from a different respective viewing angle.
Figure 7B:
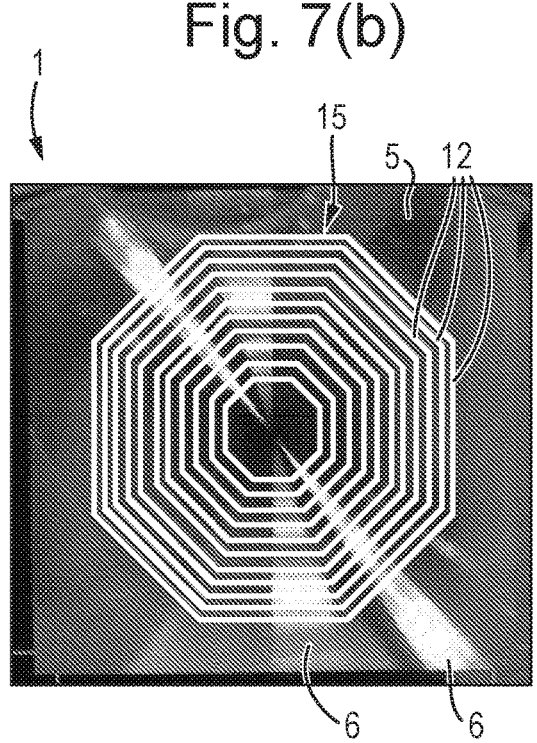
Figure 7C:
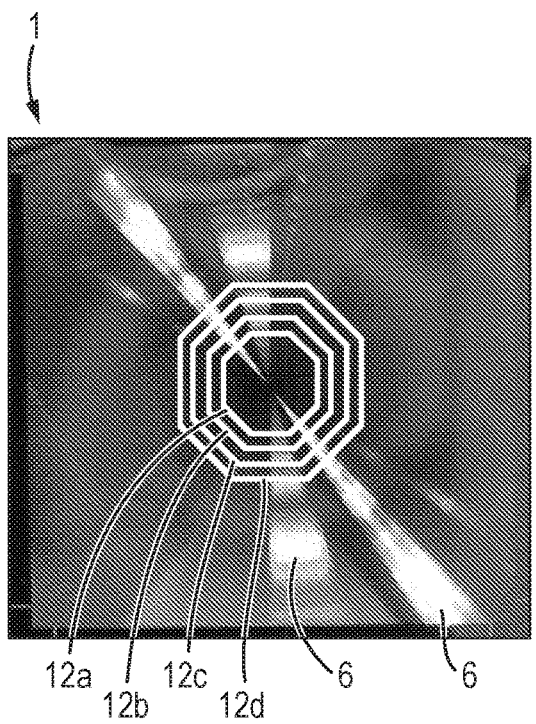
Figure 7D:
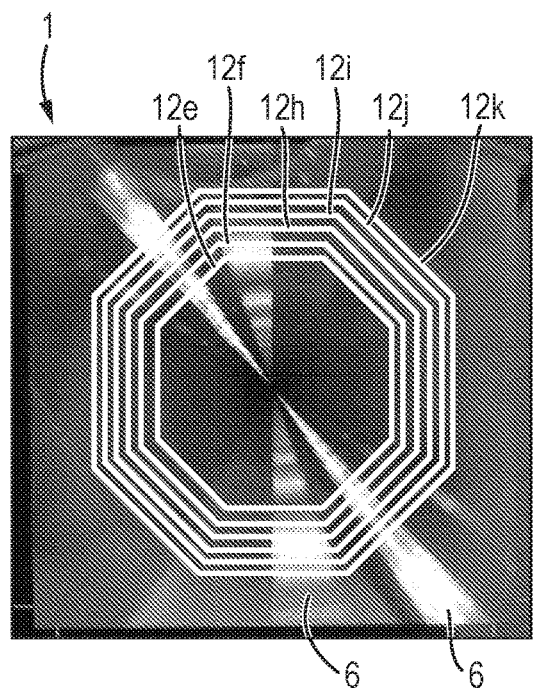

FIG. 6 is a diagram illustrating the conventions that will be used below when referencing different viewing angles. An exemplary security device 1 is shown in a perspective view, lying in the plane defined by the x- and y-axes. The normal to that plane is the z-axis. Incident, on-axis light I will be redirected and an observer O at any one viewing position will see diffracted light D, the nature of which will depend on the diffraction structure and on the viewing position. The angle between the viewer O and the normal (z-axis) is referred to as the tilt angle, denoted by θ (theta), since this will change if the device is tilted about the x-axis and/or the y-axis. The rotational position of the viewer O relative to the x- and y-axes is the azimuthal angle, denoted by φ (phi), and will vary if the device is rotated about the z-axis. A change in viewing angle may comprise both a tilt (i.e. change in θ) and a rotation (i.e. change in φ), or could comprise just one or the other. The angle φ can also be used to describe the direction of other features lying in the plane of the device as will be seen below.

A first embodiment of a security device in accordance with the present invention will now be described with reference to FIG. 7. The device 1 comprises a first diffractive structure 2 of the sort already described with reference to FIGS. 1 to 3 above, and a second diffractive structure 13. The two diffractive structures are arranged in different respective regions of the device. FIG. 7(*a*) is a schematic plan view of the device 1 illustrating the arrangement of the various regions: all of the white areas constitute first regions 11 in which the first diffractive device 2 is present, whilst each of the black areas constitute second regions 12 in which the second diffractive device 13 is present. The first and second regions 11, 12 are interspersed with one another across the device. In this case, each second region 12 takes the form of an outline of an octagon (although any other shape or other indicia could be used instead), a plurality of such outlines with decreasing size being arranged inside one another, spaced by first regions 11. All of the regions are concentric and centred on reference point P of the first diffractive structure.

The second diffractive structure 13 is an off-axis diffractive structure meaning that on-axis incident light will be redirected to some off-axis position. Examples of suitable structures include off-axis holograms as well as diffraction gratings. The second diffraction structure as a whole (i.e. taking into account all of the second regions 12) is made up of a plurality of portions each having different properties. In this example, each portion of the second diffractive structure corresponds to a different one of the second regions 12 (i.e. each of the octagonal outlines contains one portion of the second diffractive structure 13, each having different properties from one another). However, this one-to-one correspondence between portions of the second diffractive structure is preferred but not essential. For example, more than one second region 12 of the device could contain the same diffractive structure with the same properties (i.e. any one portion of the second diffractive structure may be present in more than one of the second regions 12) and/or any one second region 12 could contain more than one portion of the second diffractive structure (i.e. the properties of the second diffractive structure may not be constant across the whole of any one second region 12). The different properties of the various portions of the second diffractive structure 13 are configured such that each portion of the second diffractive structure 13 redirects incident light to a different sub-set of off-axis viewing angles (which sub-sets may or may not overlap one another). This has the result that the appearance of the second diffraction effect changes (relative to the reference frame of the carrier) according to the viewing angle.

Thus, FIG. 7(*b*) schematically illustrates the appearance of the device using a composite image in which multiple views taken from different viewing angles have been combined with the result that the diffracted light from all of the second regions 12 is visible simultaneously so all of the octagonal outlines are apparent (it will be appreciated that whilst all the octagons are shown as white in practice they typically appear in multiple different colours). This may or may not be possible in practice depending on the degree to which the sub-set of viewing angles over which each portion of the second diffractive device can be viewed overlap one another. If all of the sub-sets include at least one viewing angle which is common to all of them then all the portions will be visible simultaneously at that view point. If there is a significant degree of overlap, the portions may all be visible simultaneously over a substantial viewing range (potentially nearly all viewing angles) in which case each portion of the second diffractive device is preferably configured to direct a different wavelength of diffracted light (i.e. a different colour) to any one viewing position. In this way, whilst all of the second regions may remain visible at substantially all viewing positions, such that the extent of the second diffractive effect remains constant as the device is tilted and/or rotated, it will undergo a progressive colour change, e.g. exhibiting distinct bands of different diffracted colours which appear to move either outward from the innermost second region 12 to the outermost second region 12, or vice versa, depending on the change in viewing angle.

An effect of this sort can be achieved for example by configuring the second diffractive structure as a plurality of diffraction grating structures (one for each portion of the structure), each with different grating parameters. For example, each of the octagonal outlines 12 may contain a diffraction grating structure with a different pitch (but same orientation). Preferably, the pitches of the various portions may vary between about 0.5 microns to about 10 microns (more preferably between about 0.5 microns to about 3 microns, most preferably between about 1 and 3 microns) the pitch increasing from one region to the next in accordance with the order in which the regions 12 are arranged spatially on the device, in order to give rise to a steady progression of diffractive colours in a continuous sense across the device upon tilting.

In more preferred examples, however, the sub-set of viewing angles over which each second region of the second diffraction pattern is visible overlap to a lesser amount or not at all so that, as the viewing angle is changed, different ones of the second regions diffract light to the viewer. Thus, the regions appear to turn "on" and "off" as the device is tilted and/or rotated, giving rise to the impression that the size, shape or position of the second diffractive effect is changing, i.e. an animation. An example of this is shown with reference to FIGS. 7(c) and (d) which show the appearance of the device at two different viewing angles. In the position shown in FIG. 7(c), only the four innermost second regions 12a to d direct light to the viewer and the outer second regions do not. As such, the second diffractive effect appears only at the centre of the device. When the device is tilted and/or rotated to the position shown in FIG. 7(d), now the inner second regions are no longer visible but now the outer second regions 12e to 12k diffract light to the viewer such that the second diffractive effect no longer appears at the centre of the device but only towards the periphery. At intermediate viewing positions, some intermediate set of second regions will be visible. The result is the appearance of a contacting/expanding octagonal region as the viewing angle changes.

This can be achieved for example by forming each of the second regions 12 as a diffraction grating with different orientation (i.e. the grating lines of each second region making a different angle φ with the x-axis). Preferably, the two second regions which are furthest apart from one another will have grating orientations at substantially 90 degrees from one another whilst each intervening second region will have an intermediate orientation which varies in constant steps from one second region to the next across the device. Since each diffraction grating will spread different wavelengths of light across a range of viewing angles, a colour progression may accompany the animation effect even if the pitches of all the diffraction gratings are the same.

In other cases both the pitch and the orientation of the diffraction gratings may vary from one second region to the next and an example of this will be given below.

It will be appreciated that, in addition to the described second diffractive effect, the first diffractive effect will also be visible across the device, by virtue of the first regions 11 being interspersed with the second regions 12, and remains so at substantially all viewing angles. Thus, the first diffractive effect appears as a background to the second diffractive effect. As described previously, the first diffractive effect also exhibits movement upon changing of the viewing angle with the bright features 6 appearing to rotate around reference point P (this motion not being depicted in FIG. 7). Hence both diffractive effects will appear to actively change when the device is tilted and/or rotated. By arranging the second regions 12 such that they are centred on the reference point P and configuring the second diffractive structure to exhibit a change in colour and/or extent (size or shape) towards and away from the reference point P, the two diffractive effects appear strongly integrated with one another. Moreover, any misregister between the two effects (as might be the case in a counterfeit device made by laminating two diffractive elements on top of one another) will be immediately apparent.

In order to ensure good visibility of the first diffraction pattern, across the area of the device where the first and second regions 11, 12 are interspersed (i.e. inside the outermost octagonal outline, in this case), the second regions 12 preferably collectively occupy no more than 50% of the surface area, still preferably no more than 30%. This enables a significant proportion of the first diffraction pattern to be viewed in between the second regions.

Each second region 12 is preferably sufficiently large so as to be individually distinguishable to the naked eye. For example, in the present case the octagonal outline regions 12 may each have a line thickness of at least 300 microns. If the first diffraction structure 2 is absent in the second regions 12, as is the case in some embodiments, this has the result that, even at viewing angles at which the second region 12 in question does not direct diffracted light to the viewer, the presence of the second region 12 will be visible as an interruption in the first diffraction pattern. Hence, the full extent of the second diffraction structure in all second regions 12 may be visible as a "ghost image" even at viewing angles where only parts of the second diffractive effect are intended to be seen.

FIG. 8 shows a second embodiment of a security device in which this effect is reduced. As before, the first and second diffractive structures are arranged in respective regions 11, 12 as shown schematically in FIG. 8(a). In this example, there are four second regions 12a to 12d each having the form of the outline of a star centred on reference point P of the first diffraction pattern, and spaced from the next by the first region 11. The size of the outlines 12a to 12d increases such that they are nested inside one another. However, rather than a continuous line, each second region 12a to 12d comprises a series of dot elements in which the second diffractive structure is present (shown in black, not individually labelled), interspersed with elements of the first diffractive structure 2 (shown in white). Thus, within each second region 12a to 12d is an array of first elemental areas carrying the first diffractive structure 2 and an array of second elemental areas carrying the second diffractive structure 13. The elemental areas are formed at a scale too small to be individually discernible to the naked eye, e.g. having a width of 300 microns or less. It will be appreciated that, in the Figures, the individual elemental areas making up each second region 12a to 12d are shown at a much larger scale than will be the case in practice, for clarity. Within each second region 12a to 12d, the second elemental areas carrying the second diffractive structure preferably take up no more than 50% of the area of the second region, to ensure good visibility of the first diffractive structure.

By forming each second region as a fine array of interspersed elemental areas of the first and second diffraction patterns on a scale too small for resolution by the naked eye, when a portion of the second diffraction pattern is not diffracting light to the viewer, its presence is less discernible (and preferably not discernible). As such the first diffraction pattern appears substantially without interruption and any "ghost image" is significantly less visible.

Figure 8A:
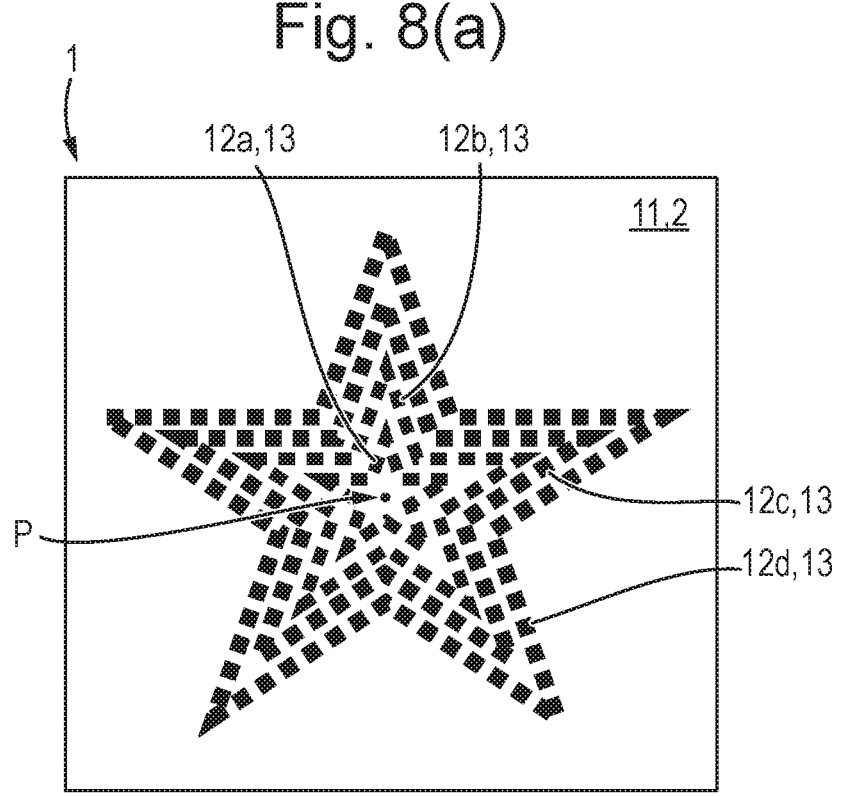
FIG. 8 depicts a second embodiment of a security device, FIG. 8(*a*) showing schematically the arrangement of first and second regions across the device, FIG. 8(*b*) showing a composite view of the device compiling its appearance from multiple viewing angles, and FIGS. 8(*c*) to (*f*) each showing a view of the device from a different respective viewing angle.
Figure 8B:
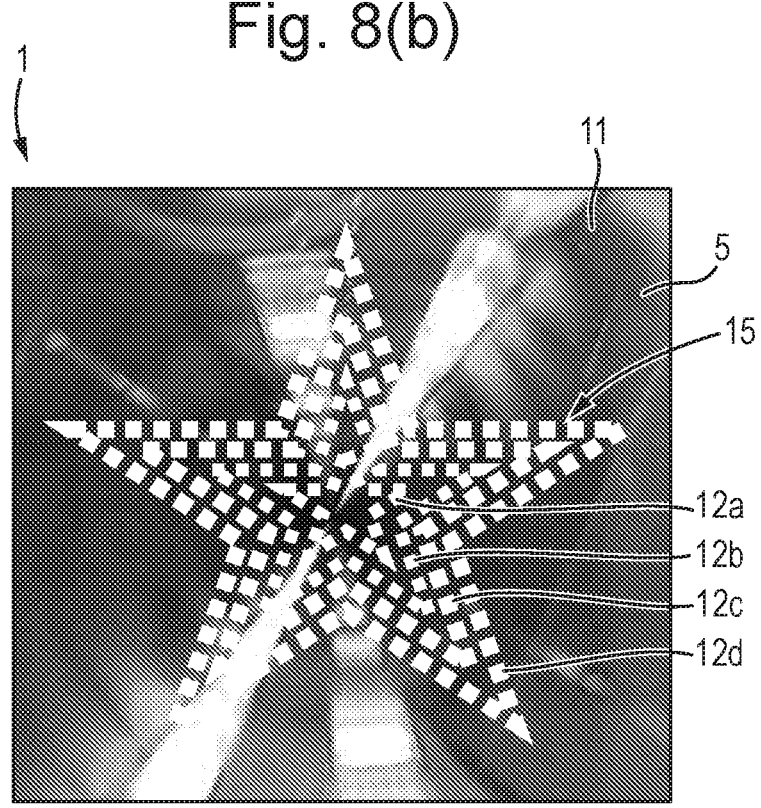
Figure 8C:
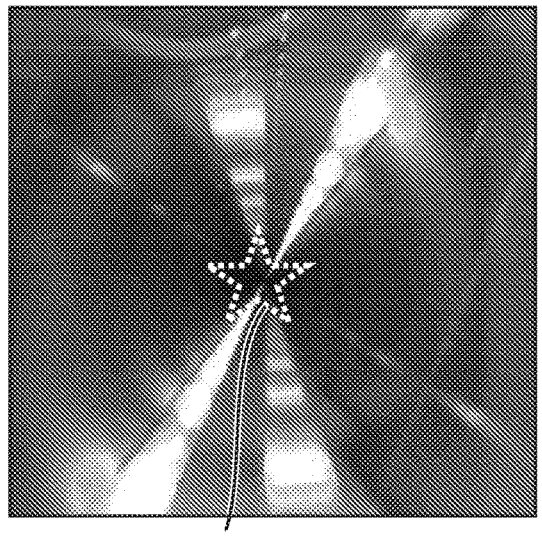
Figure 8D:
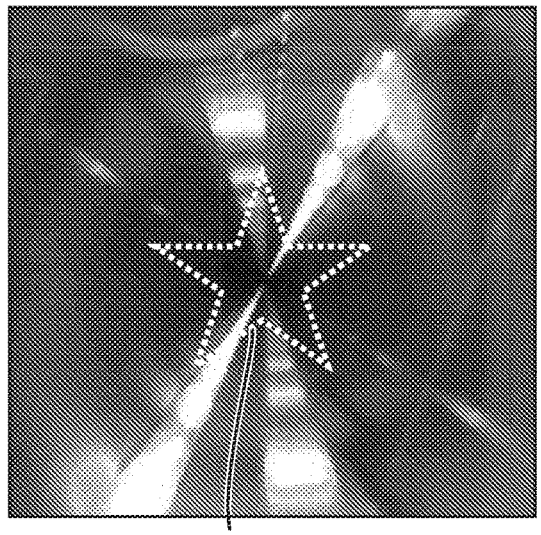
Figure 8E:
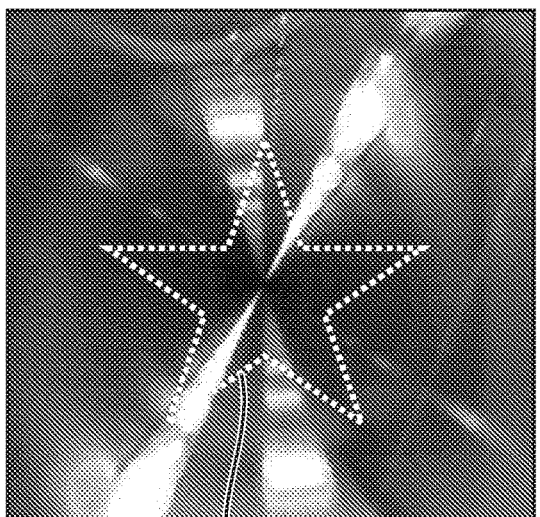
Figure 8F:
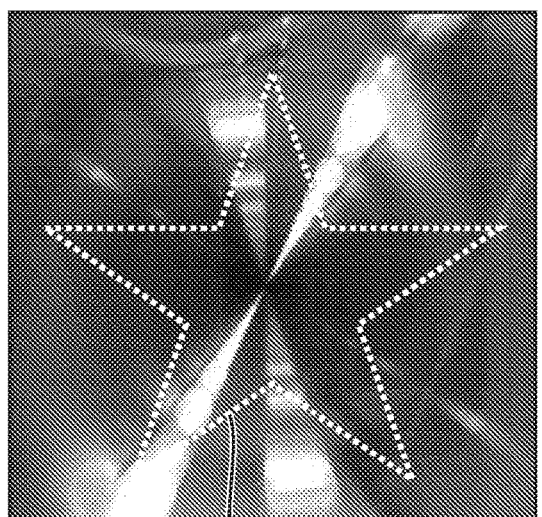
Figure 9A:
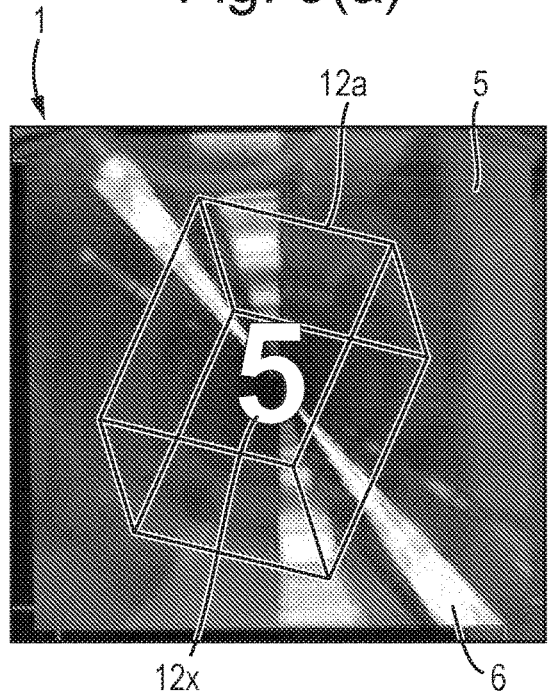
FIG. 9 depicts a third embodiment of a security device, FIGS. 9(*a*) to (*d*) each showing a view of the device from a different respective viewing angle.
Figure 9B:
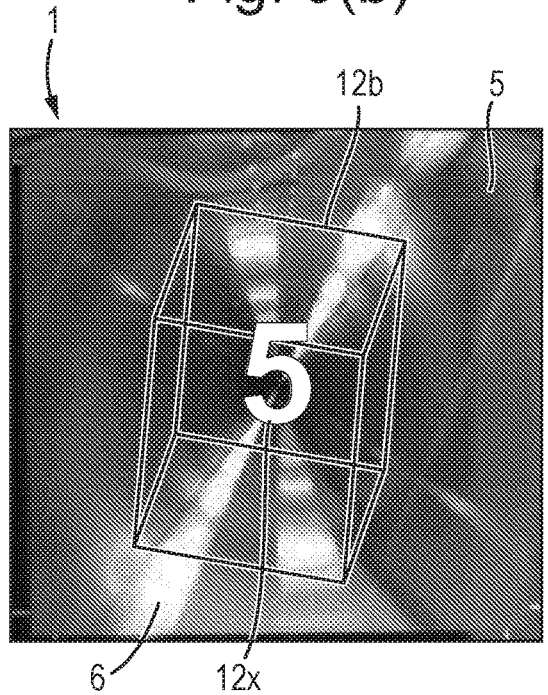
Figure 9C:
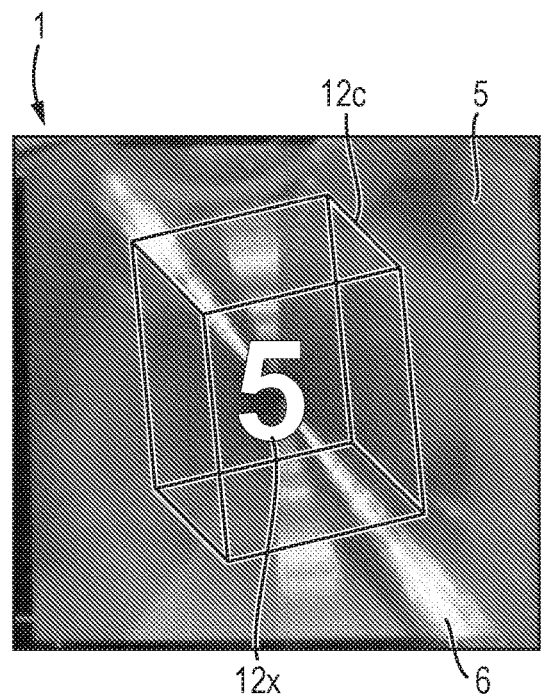
Figure 9D:
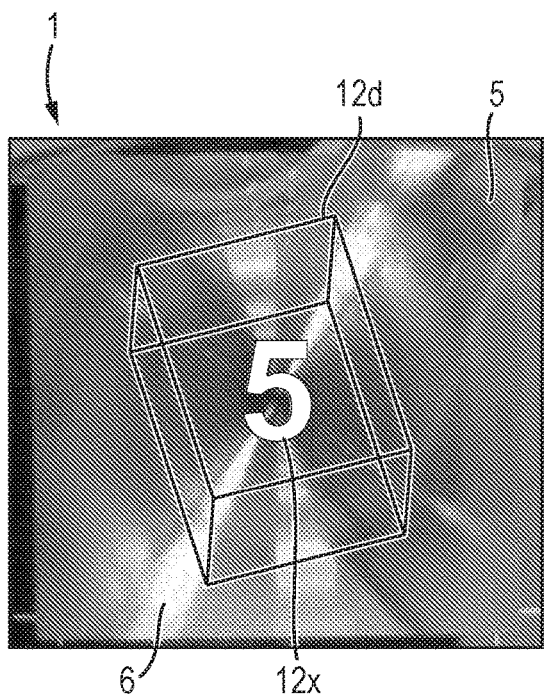

As in the FIG. 7 embodiment, each second region 12a to 12d has different properties, i.e. its second elemental areas correspond to a different portion of the second diffractive structure from those in another of the second regions. Preferably each second region 12a to 12d is visible at a different sub-set of viewing angles. FIG. 8(b) is a composite image showing views of the device at several different viewing angles in combination, to illustrate the full extent of the second diffraction effect 15 against a background of the first diffraction pattern 5, although this may not be visible at any viewing angle in practice.

The second diffractive structure preferably comprises a plurality of diffraction grating structures with different parameters, one in each of the second regions 12a to 12d. In a first implementation, each second region has a different grating orientation (i.e. azimuthal angle φ), preferably varying across a 90 degree range, but constant grating pitch. For example, in the second region 12a the grating has a nominal orientation of zero degrees, in the next region 12b, the grating has an orientation of 30 degrees, in the next region 12c, the grating has an orientation of 60 degrees and in the outermost region 12c, the grating has an orientation of 90 degrees. This will result in different ones of the star-shaped outlines becoming visible either as the device is rotated about the z-axis (change in rotational viewing angle) or as the device is tilted left-right (change in tilt angle about the y-axis). FIGS. 8(c) to (f) show the appearance of the device at different viewing positions. The result is a star-shaped outline which appears to expand or contact as the viewing angle is changed. The colour of the star may undergo some change with viewing angle due to the natural wavelength dispersion of each diffraction grating but this will not be tied to the expansion effect.

Similar results can be achieved if the grating pitch but not the orientation is varied from one second region to the next. For example the grating pitch may be varied progressively from 0.6 microns in the innermost second region 12a to 1.2 microns in the outermost second region 12d.

In a further variant, both the grating orientation and the pitch may be varied progressively from one second region to the next. This links a change in colour to the change in which star-shaped outline is visible, such that as the star appears to expand or contract upon tilting or rotation, it also undergoes a change in colour. Hence the star appearing in the view shown in FIG. 8(c) may appear yellow, that in FIG. 8(d) green, that in FIG. 8(e) blue and that in FIG. 8(f) purple, for example.

FIGS. 9, 10 and 11 show further examples of security devices in which the same principles as already described in relation to FIGS. 7 and 8 are employed. FIGS. 9(a) to 9(d) show a security device in accordance with a third embodiment, from four different viewing angles. In this case, the second diffractive device exhibits an indicia, here the digit "5", and an outline of a cuboid. The digit "5" is positioned substantially on the reference point P of the first diffraction pattern and is formed of a second region 12x in which the second diffractive structure is configured to diffract light across a wide range of viewing angles, potentially substantially all viewing angles, so that it is visible from most points of view. As such the digit "5" remains substantially static upon tilting and/or rotation (although it may exhibit a change in diffracted colour). Meanwhile, the cuboid feature is made up of a plurality of outlines, each corresponding to a different second region 12a, 12b etc., each depicting the same cuboid but from a different perspective. Four of the outlines 12a, 12b, 12c and 12d are shown in FIGS. 9(a) to (d) respectively. More second regions exhibiting further outlines of the cuboid at other orientations could be provided but are not visible at the viewing angles depicted. The second diffractive structure is configured differently in each of the second regions, for instance comprising a diffraction grating with different orientation and/or pitch in each second region, so that as the device is tilted and/or rotated, different ones of the outlines become visible. This has the result that the cuboid appears to rotate around the static digit "5" (or other indicia) 12x. The first diffraction pattern 5 also exhibits motion as the viewing angle is changed as previously described. The shape and positions of the cuboid outlines 12a, 12b . . . and the portion of the second diffractive structure contained in each could be configured so that, as the viewing angle is changed leading to motion of the bright features 6 in the first diffraction pattern, the cuboid appears to move at substantially the same speed and in the same direction as the bright features 6, giving the impression that there is no relative movement of the cuboid to the first diffraction pattern, although both will appear to move relative to the digit "5", and to any other reference point which is fixed relative to the reference frame of the carrier.

In this embodiment, each second region 12 may contain solely the second diffractive structure, in which case they will interrupt the first diffraction pattern, but preferably the first and second diffraction structures are combined in the second regions 12, e.g. by arranging each as an array of elemental areas in the manner described with reference to FIG. 8. Another option for combining the diffractive structures will be described below.

FIG. 10 shows a fourth embodiment of a security device as a composite image made up of views from multiple different viewing angles. In this case the second diffractive device is arranged in a series of second regions 12a, 12b . . . each having the form of a concentric circle centred on the reference point P of the first diffraction pattern. Each concentric circle is formed as a broken line to maintain the visibility of the first diffraction pattern, and optionally each part of the broken line may be formed as an array of elemental areas in the manner described above to further reduce any "ghost image" effect. The second diffractive structure is configured differently in each of the concentric circles applying the same principles as above such that upon tilting and/or rotating, different ones of the circles become visible, resulting in an expansion/contraction effect, and/or the circles exhibit a progressive change in colour.

FIG. 11 shows a fifth embodiment of a security device as a composite image made up of views from multiple different viewing angles. In this case the second diffractive device is arranged in a series of ellipses 12a to 12e with different orientations, each centred on the reference point P of the first diffraction pattern, intersecting one another as shown. A further second region 12x in the form of the digit "5" is provided at the centre, and is configured to remain substantially static upon tilting as in the FIG. 9 embodiment. The elliptical second regions 12a to 12e are each provided with a different portion of the second diffractive structure with different properties such that, upon tilting, different ones of the ellipses become progressively visible. Thus, at any one viewing angle, a subset of the ellipses is visible (e.g. one ellipse, or two orthogonal ellipses) and upon tilting this appears to rotate about the digit "5". As in the case of FIG. 9, the second regions could be configured such that the apparent motion of the ellipse(s) appears to track that of the bright features 6 in the first diffraction pattern.

FIGS. 12 and 13 depict a sixth embodiment of a security device in which the second diffraction structure is configured such that different effects are exhibited upon different changes in viewing angle. FIG. 12 is a composite image made up of views from multiple different viewing angles so that all parts of the second diffraction pattern 15 are visible against the first diffraction pattern 5. It will be seen that the second diffraction structure is provided in a pattern of second regions 12 which is arranged in four concentric rings. The innermost ring 12a comprises a set of eight star-shaped second regions arranged in a circle entered on the reference point P of the first diffraction pattern. The neighbouring ring 12b comprises eight second regions each having the shape of the digit "5". Next out, ring 12c comprises eight star-shaped second regions and finally outermost ring 12d comprises a further eight second regions each in the shape of a digit "5".

It will be noted that the size of the second regions increases with distance from the reference point P and this is preferred since this gives the appearance of perspective which reinforces that suggested by the first diffraction pattern.

In this case, the properties of the second diffractive structure (which preferably comprises a plurality of diffraction gratings) vary not only between each ring of symbols 12a, 12b etc., but also circumferentially from one second region to the next within each ring. Thus, in the eight stars making up innermost ring 12a, the grating pitch is constant but the grating orientation (azimuthal angle φ) varies from one to the next, progressively in a clockwise direction. In the eight "5"s making up the next ring 12b, the grating pitch is again constant but different from that in innermost ring 12a. The grating orientation varies between the "5"s making up ring 12b clockwise in the same manner as in the innermost ring 12a, such that the second regions 12a, 12b lined up along any one radial direction all share the same grating orientation but vary in grating pitch. Likewise, the second regions making up rings 12c and 12d vary in pitch according to their distance from the centre and in their grating orientation according to their position about the circumference of the arrangement.

This configuration has the result that when the device is tilted up-down (about the x-axis) a different effect is observed as compared with tilting the device left-right (about the y-axis). Rotating the device about the z-axis will produce a similar effect as that observed upon tilting left-right. FIG. 13 illustrates the different effects, showing only the second diffractive structure for clarity. The angle of each view is denoted by: N (normal view), L (left tilt), LL (increased left tilt), R (right tilt), RR (increased right tilt), U (up tilt) and D (down tilt). Thus, in the normal view (N), only the eight "5"s making up ring 12b and the eight stars making up ring 12c diffract light to the viewer and hence are visible. Due to the difference in grating pitch between the two rings, the "5"s 12b appear in one colour, e.g. green, whilst the stars 12c appear in a different colour, e.g. yellow. Upon tilting up (view U), the "5"s making up ring 12b cease diffracting light to the viewer whilst the outermost "5"s making up ring 12d now become visible. Thus, the second diffractive effect appears to have expanded away from the centre of the device. At this position the visible "5"s and stars will again appear in different colours, e.g. the outermost "5"s 12d may appear red (whilst the stars 12c remain yellow). When the device is tilted down (view D), now only the innermost ring 12a of stars and "5"s 12b are visible so the device appears to have contracted towards the centre. The innermost stars 12a appear in a still further colour, e.g. blue. Therefore, upon up-down tilting, the second diffractive effect appears to expand and contract about the centre point and also undergoes a colour change in step with the expansion/contraction effect.

Returning to the normal view N, when the device is tilted left-right, different ones of the second regions making up each ring 12a, 12b . . . will be visible depending on the tilt angle, as a result of their different grating orientations. Since all of the regions along any one radial direction have the same grating orientation, this will appear as a line of indicia which appears to rotate about the centre of the device. Thus in the far left view LL, only those second regions 12a to 12d lying on the x-axis are visible. Upon tilting to a nearer left view L, only those second regions 12a to 12d lying on the diagonal line equidistant between the x- and y-axes are visible giving the impression of rotation. Similarly as the device is tilted to the right (R) and then further right (RR) the active regions will appear to continue their rotation. This results in a particularly strong visual effect which interacts with the motion of the first diffraction pattern (not shown).

Each of the second regions 12a to 12d could contain the second diffraction structure only, or could contain the first and second diffraction structures in combination (using the method of FIG. 8 or the alternative described below) to maintain the visibility of the first diffraction pattern.

A seventh embodiment of a security device is shown in FIGS. 14 and 15 to illustrate more complex graphical effects that can be achieved using the same principles as already explained. FIG. 14 is a composite image made up of views from multiple different viewing angles so that all parts of the second diffraction pattern 15 are visible against the first diffraction pattern 5. Unlike previous examples, FIGS. 14 and 15 comprise photographs of a real sample device and so the movement exhibited by the first diffraction pattern upon tilting is also visible. It will be noted that in this embodiment the majority of the first diffraction pattern 5 appears dark at any one viewing angle leaving only the bright features (here labelled 6', 6" and 6'") visible: this is due to the photographs having been taken under relatively narrow sources of light, rather than under ambient illumination (e.g. daylight) as in previous images. Due to the superposition of images making up FIG. 14, three bright features 6', 6" and 6'" appear in the first diffraction device. However as will become clear from FIG. 15 these in fact show a single bright feature 6 at different positions as it moves across the device.

In this embodiment, the second diffractive structure is provided in a series of second regions 12 which collectively form an image of a centurion's head as shown in FIG. 14. The individual second portions will be illustrated in FIG. 13. Each second portion is made up of an array of elemental areas in the form of dots, spaced by areas of the first diffraction pattern. In the Figures, the device is shown at a large size so that the elemental areas can be seen but in practice these will be on a scale too small for the naked eye to individually discern, or only upon close inspection. For instance, each dot element may have a diameter of 300 microns or less. The centurion's head as a whole appears coloured with a rainbow spectrum which varies continuously across the device, e.g. from top to bottom. This is due to the natural dispersion of wavelengths by the second diffractive device and is not linked to the animation effect described below.

The various features of the centurion's head are provided by different second regions 12 of the second diffractive structure each having different properties from one another. In this case, each portion is a diffraction grating having a different orientation (but equal pitch), varying from φ=0 to φ=90 preferably in equal steps. Thus, for example, the outline showing the centurion's profile and helmet may be provided by one second region (or more than one concentric outline region), whilst the internal features such as the shading to the centurion's cheek and forehead may be provided by another (one or more) second region.

The appearance of the device at different viewing positions is illustrated in FIG. 15. FIG. 15(a) shows the appearance of the device at substantially the normal viewing position. It will be seen that the second region 12a of the second diffractive structure which is visible forms an outline of the centurion, with no internal detail. The colour of the outline varies gradually from orange/yellow at the top to green/blue at the bottom, due to the natural dispersion effect of the diffraction grating. Upon tilting the device down (i.e. about the x-axis), as shown in FIG. 15(b) substantially the same second region 12a remains visible but becomes brighter as bright colours of the diffraction spectrum (red/ orange) are directed to the viewer, resulting also in an apparent increase in the width of the outline. In contrast, when the device is tilted up (FIG. 15(c)), the blue/purple portion of the diffraction spectrum is directed the viewer and the same second region 12a therefore appears darker and narrower. It will be noted that the location of the bright feature 6" in the first diffraction pattern remains substantially unchanged during this movement.

Figure 15A:
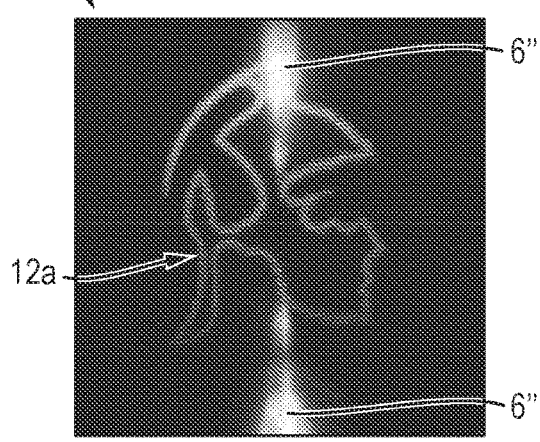
Figure 15D:
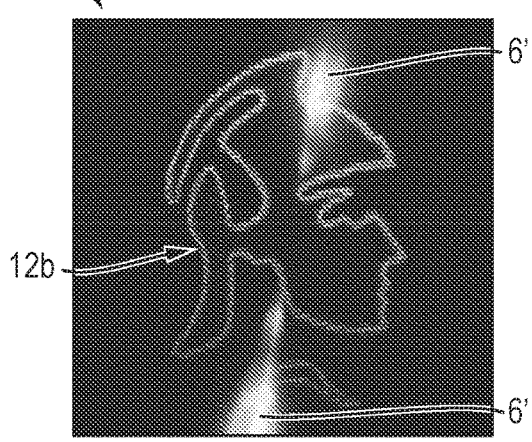
Figure 15B:
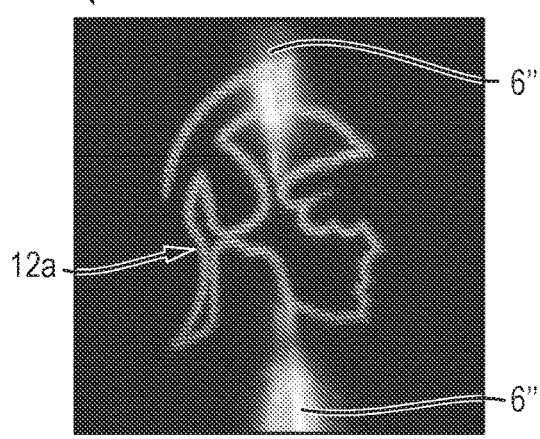
Figure 15E:
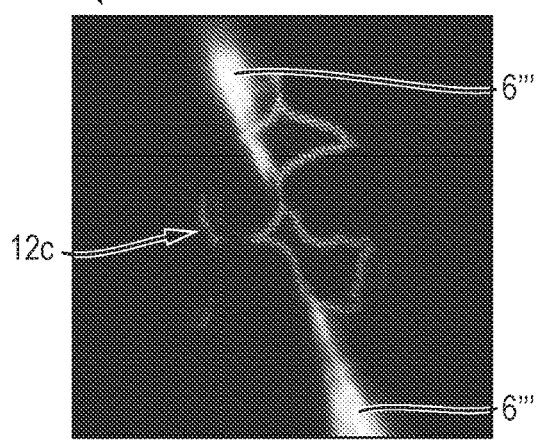
Figure 15C:
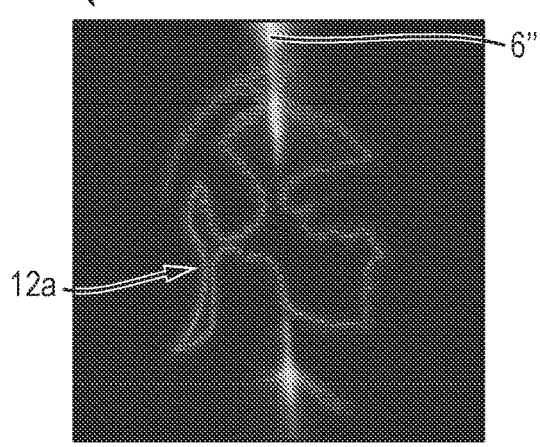
Figure 15F:
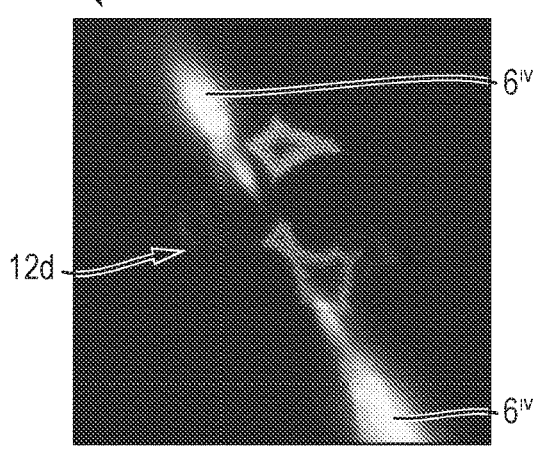

Returning to the normal viewing position, when the device is now tilted left-right, different second portions 12 become visible in turn. As shown in FIG. 15(d) when the device is tilted to the left, a different outline 12b of the centurion's head now becomes visible, which lies outside the outline 12a. Thus, an expansion of the device appears to have taken place. The colour of the outline 12b remains similar to that of outline 12a, i.e. ranging from orange/yellow at the top to green/blue at the bottom. If the device is tilted to the right, the full outline of the centurion's head is no longer displayed but rather an internal detail 12c outlining the centurion's cheek and forehead (FIG. 15(e)), giving the impression of contraction. Upon further tilting in the same direction (FIG. 15(f)), the device appears to contract still further such that now only the centurion's cheek and forehead are visible. It will be noted that the position of the bright feature 6 appears to rotate between different locations 6', 6''' and 6''' during this tilt motion.

In the embodiments of FIGS. 7 to 15, a first diffractive structure in the form of a circular zone plate has been used in each case and as such the second diffractive structures have generally been designed to include circular rotational symmetry and/or to exhibit changes towards or away from the reference point of the first diffractive structure. However in cases where the first diffractive structure is based on some other three-dimensional surface shape, the second diffractive structure is preferably designed so as to appear visually integrated with the displayed first diffraction pattern. For example, where the first diffraction pattern is based on a cylindrical surface and hence has a reference line rather than a reference point, the second diffractive structure may be configured to exhibit motion (or a colour change) along the same direction as the reference line. This can be achieved by arranging suitably configured second regions 12 spaced along the relevant direction.

Figure 17A:
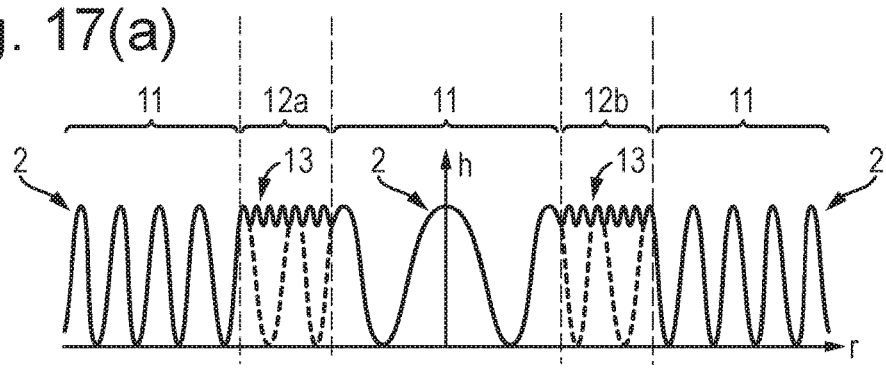
Figure 17B:
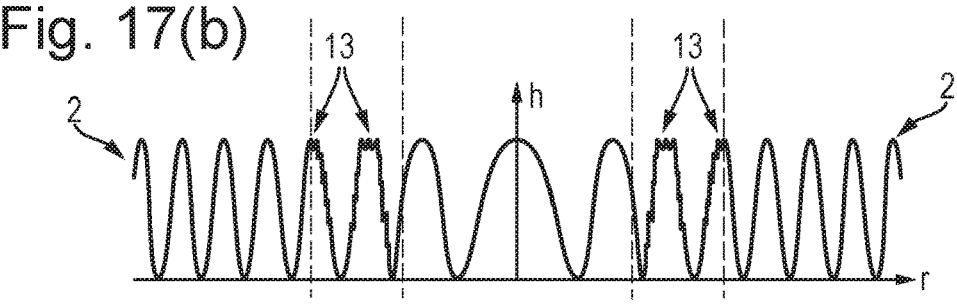
Figure 17C:
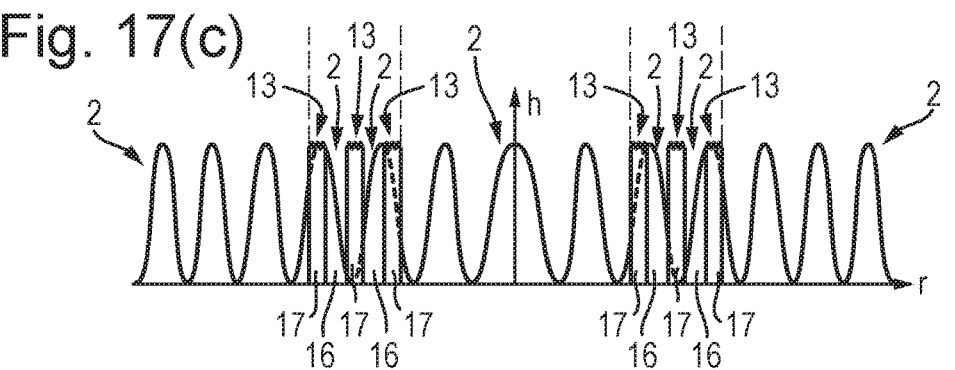

FIGS. 16 and 17 schematically illustrate various alternative approaches for incorporating the first and second diffractive structures 2, 13, into the device. FIG. 16 shows a part of a device 1 which includes two second portions 12a, 12b in which the second diffractive structure is present, spaced and surrounded by a first region 11 in which the first diffractive structure is present. FIGS. 17(a) to (c) show three alternative cross-sections through the device 1 along the line X-X'. It will be appreciated that the cross-sections are schematic and not shown to scale.

The first diffractive structure 2 is of the same type as already discussed with respect to FIGS. 1 and 2 and in this case a sinusoidal profile shape is adopted. The surface relief of the carrier follows the form of the first diffractive structure 2 across the whole of first region 11. The second regions 12 can be implemented in different ways. In a first option, shown in FIG. 17(a), within the second regions 12a, 12b, the first diffractive structure 2 (shown in dashed lines) is entirely replaced by the second diffractive structure 13. This was the case in the FIG. 7 embodiment discussed above and as previously mentioned gives rise to interruptions in the first diffraction pattern which may appear as a "ghost image" of the second diffractive structure.

FIG. 17(c) shows the technique adopted in the FIG. 8 embodiment for reducing this effect. Namely, within each of the second regions 12a, 12b, the first diffractive structure 2 is present in a first array of elemental areas 16 which are interspersed with a second array of elemental areas 17 in which the second diffractive structure 13 is present. The elemental areas are provided on a scale too small for the naked eye to resolve, e.g. 300 microns or less. Preferably, the fill factor of the second elemental areas 17 is 50% or less.

An alternative method for avoiding "ghost images" is shown in FIG. 17(b). Here, the first and second diffractive patterns are combined in the second regions 12a, 12b by superimposing the second diffractive structure 13 on top of the first diffractive structure 2. Thus, the peaks of the first diffractive structure are effectively modified in the second regions according to the second diffractive structure (as shown in FIG. 17(b), it should be noted that the modification will typically extend down the flanks of the peaks as well as the tops). To achieve this, the profile depth of the second diffractive structure should be smaller than that of the first diffractive structure. In this way, the diffractive efficiency of the two diffractive structures can be balanced against one another in the second regions so that both can be visualised.

Consider the example where both the first and second diffractive structures are generated by exposing the respective optical light patterns into photo-resist and then developing the exposed resist (discussed in more detail below): in a scenario where the two structures are separately recorded into separate photo-resists then the depth of grating that is generated via the development process will, for a given developer type, concentration and temperature, be a function of the optical exposure energy E and the development time T.

Suppose the exposure energy required to ensure that the off axis diffractive structure develops a grating peak to trough amplitude which maximises the diffractive replay efficiency for a development time T is E1 (giving a peak to trough depth of approximately $\lambda/3n$, where $\lambda$ is a visible light wavelength and n is the refractive index of the carrier), and the exposure energy required to ensure that the Fresnel zone structure develops a peak to trough amplitude which maximises its respective diffractive replay efficiency for the same development time T is E2.

It follows that the respective exposure energies for the superposition of the two diffractive structures will be $\alpha$E1 and $\beta$E2 where $\alpha$ and $\beta$ have values less than 1.

Nominally both $\alpha$ and $\beta$ could have the same value of 0.5, meaning that they each received half the single grating exposure energy and thus each structure will have an amplitude half that required for peak diffraction efficiency. In this scenario neither grating will significantly affect the brightness of the other. If for example $\alpha$ increased relative to $\beta$ then this will favour brightness of the off axis device versus the Fresnel device and vice versa. The preferred values of $\alpha$ and $\beta$ are determined by the holographer's design preference. In practice the holographer will typically assess brightness of the two devices by eye or light meter and then adjust the exposure energy accordingly to achieve the desired balance, e.g. in an iterative process.

In a typical example the depth of the second (off-axis) diffractive structure could be approximately 150 nm and the depth of the first diffractive structure (the zone plate) is preferably configured to have a profile depth greater than this (e.g. between 200 and 300 nm).

The first and second diffractive structures can be generated in various ways. FIGS. 18 and 19 show two possible recording geometries for holographic generation of a diffractive zone plate structure suitable for use as the first diffractive structure in any of the presently disclosed embodiments. Referring first to FIG. 18, a resist layer 31 (optionally supported on a transparent substrate) is placed in near contact with an object having a continuously curved reflecting surface of the desired shape. In the present case this is provided by a spherical converging lens 32 (which may be coated with a reflective material such as metal on its reverse side). A collimated beam of laser light L is then arranged to fall on this combination parallel to the optical axis of the lens 32 (e.g. via mirror 33), first passing through the back surface of the resist plate, then through the resist layer 31 itself before impinging on the lens 32. Light is then reflected back from at least the back surface of the lens 32. This reflected light will interfere with the incident light to form a holographic interference pattern within the plane of the resist, resulting in concentric interference fringes of high and low light intensity, following the same lateral pattern as shown previously in FIG. 1. Each successive bright fringe represents a further $2\pi$ phase difference between the incident and reflected wavefronts.

This process essentially corresponds to recording an on-axis hologram of the lens 32. Since the lens 32 and resist plate 31 are in near contact, the resulting hologram will have a viewing angle which covers essentially the full angular hemisphere. This ensures that the first diffraction pattern 5, described above, will be visible at substantially all viewing angles.

The process can be adapted to record zone plate structures from any desired curved surface by replacing the lens 32 with an appropriately shaped reflecting surface. For example, FIG. 19 shows the use of a bi-concave lens 32' to create a Fresnel zone plate structure of a diverging lens. In still further examples, the lens 32, 32' could be replaced by a cylindrical lens to create a cylindrical zone structure as shown in FIG. 4, or by an ellipsoidal surface to create the zone structure shown in FIG. 5.

Figure 20:
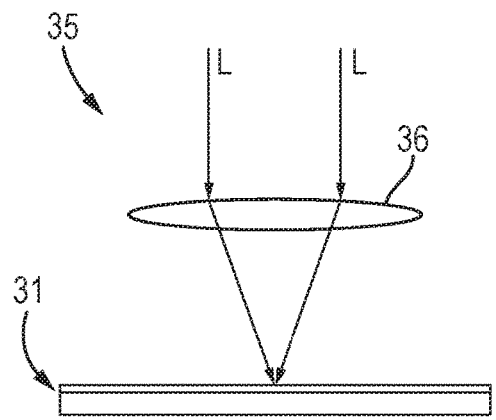
Figure 21:
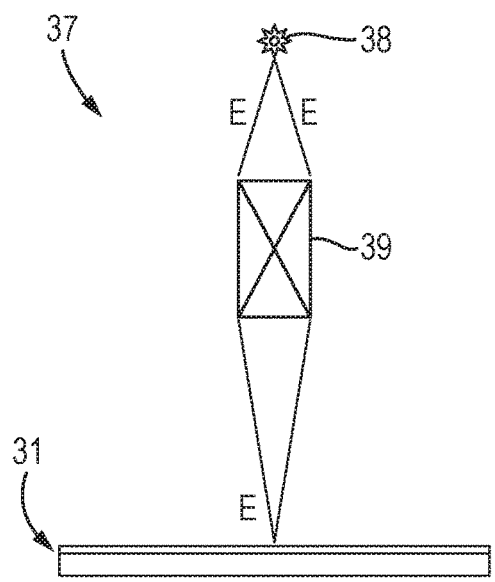

Holographic methods of generating the first diffractive structure such as those described above are particularly preferred since these result in a sinusoidal profile (see FIG. 2(a)) with reduced diffraction efficiency as compared with other techniques. However, alternative techniques are available for forming the first diffractive structure and some of these, involving direct writing of the structure, are illustrated in FIGS. 20 and 21. FIG. 20 schematically illustrates the use of an optical fringe writer 35 in which collimated laser light L is focussed by optics 36 onto the resist plate 31. The fringe writer is controlled to move the laser beam in accordance with the desired pattern to which the resist is to be exposed. This will be determined by mathematically modelling the interference pattern that would generated by the desired continuously curved surface (e.g. the lens 32 shown in FIG. 18) to ascertain the form of the corresponding zone plate structure. As an alternative to an optical fringe writer 35, the resist plate 31 could be exposed to the desired pattern using electron beam lithography, for which schematic apparatus 37 is shown in FIG. 21. A source of electrons 38 is used to generate an electron beam E which is then focussed and controlled by beam optics 39 as known in the art to expose the resist layer 31 in accordance with the desired pattern.

Typically for a lithographic resist material (e.g. Shipley S1813), the laser light L may have a wavelength of 412 nm, 441 nm or 458 nm. Where electron beam lithography is utilised, a suitable resist material responsive to electron irradiation should be used instead. When the exposed resist plate 31 is then developed in a suitable substance (e.g. Shipley Micro posit 303), those regions of the resist which were exposed to high intensity light (e.g. interference maxima in the holographic techniques, or under the path of the laser beam or electron beam in the direct-write methods) are removed by the action of the developer to become troughs, whilst those areas which are not exposed or experience light intensity (e.g. interference minima) remain to become surface relief peaks.

Having developed the relief structure, the resist plate can be used as a cast to form a master hologram relief in a suitably robust material, from which copies of the original relief can be embossed into suitable carriers such as a lacquer layer. Alternatively the master hologram relief can be used as a cast-cure mould for replicating the surface relief into carrier resin which can then be cured to fix the relief. In practice, the master hologram may not be cast from the developed resist until the second diffractive structure has additionally been formed as discussed below, although in other cases the second diffractive structure could be formed directly in the master hologram relief, i.e. after casting of the first diffraction structure. (In alternative embodiments where the first diffractive structure is to be formed as an amplitude-difference device, the so-produced relief can be used to form corresponding demetallised regions using the method disclosed in US-A-2009/0317595.)

The first diffractive structure 2 may be formed across the whole resist layer 31 and then modified or destroyed in the second regions 12 by the introduction of the second diffractive structure 13. As described with reference to FIGS. 17(a) to (c), this could involve replacing the whole of the first diffraction structure across each second region with the second diffraction structure, or superimposing the second diffraction structure on top of the first diffraction structure, or replacing the first diffraction structure with the second only in an array of elemental areas 17 within each second region 12.

Figure 22:
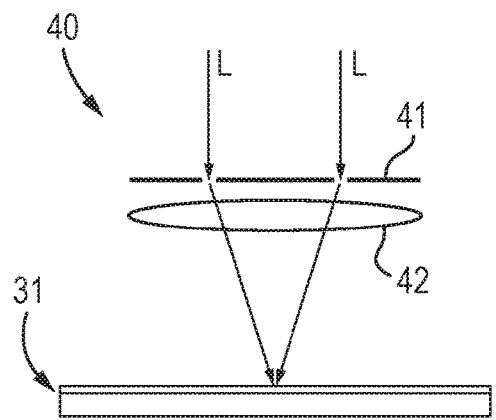
Figure 23:
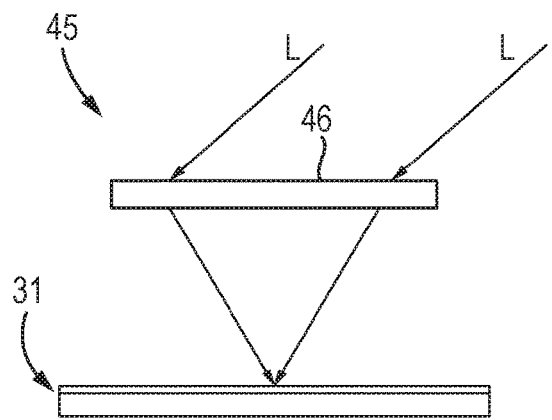

The second diffractive structure can be formed into the resist layer 31 already carrying the first diffractive structure using various techniques, including an optical fringe writer or electron beam lithography as already described above. These are preferred since then the same apparatus can be used to form both the first and second diffractive structures. Alternatively, the second diffractive structure could be formed using a dot matrix optical writer, as shown in FIG. 22, in which a collimated laser beam L is passed through a mask 41 defining at least two apertures and focussed by optics 42 onto the resist plate 31 to form the desired pattern from a series of exposed dots. Each exposed dot in fact is formed of a series of lines resulting from interference between the at least two light beams passed by the mask 41. In a still further example, the second diffractive structure could itself be formed holographically, e.g. by H1-H image plane rainbow lithography as illustrated in FIG. 23. Here, a H1 transmission hologram 46 is illuminated by off-axis laser light L passing therethrough, the resulting holographic image being recorded in the resist plate 31.

It is also possible to form the first and second diffractive structures 2, 13 in their respective regions of resist plate 31 in a single process step, by digitally combining the desired first diffractive structure with the second diffractive structure to generate the surface relief pattern required across the whole device (i.e. including the first and second regions). This can then be transferred into the resist plate 31 by a direct writing method such as an optical fringe writer or electron beam lithography, controlled in accordance with the combined surface relief pattern.

Once the first and second diffractive structures have been formed, the resulting surface relief can be transferred into a suitable carrier, e.g. by embossing or cast-curing as mentioned above. To improve the visibility of the diffraction patterns, typically a reflection enhancing layer such as metal or a high refractive index material (e.g. ZnS) will be applied onto the carrier in such a way as to conform to the contours of the surface relief, preferably on both sides of the reflection enhancing layer so that the diffraction patterns can be viewed from both sides of the device. For example, a metal layer of aluminium, copper, chromium or the like (or any alloy thereof) may be applied to the surface relief by vapour deposition or similar. In other cases, a reflective ink (e.g. metallic ink) could be used for this purpose and applied by printing or another coating technique.

Figure 24A:
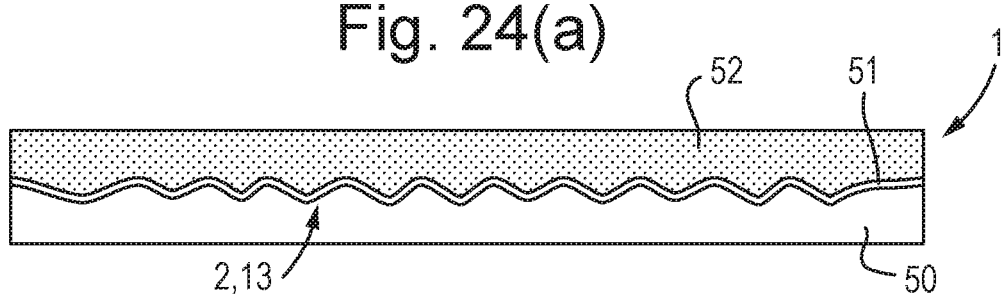

FIG. 24(a) shows schematically an example of a security device 1 formed in this way, in cross-section. The carrier 50 comprises a lacquer or resin into which a surface relief combining the two diffractive structures 2, 13 has been formed, e.g. by embossing or cast-curing. The carrier 50 is preferably transparent (optionally having a coloured tint) in order that the diffraction effects can be viewed through it, but this is not essential if the effects can be viewed from the other side. A reflection enhancing layer 51 (which may be of any of the types mentioned above) follows the contours of the relief structure. Optionally, the reflection enhancing layer is covered by a further layer 52, which is preferably transparent, such as a lacquer layer which may act as a protective layer and/or could have further functionality. For example, the layer 52 could carry a coloured tint so that the colour appearance of the device 1 is different when viewed from each side of the device.

Figure 24B:
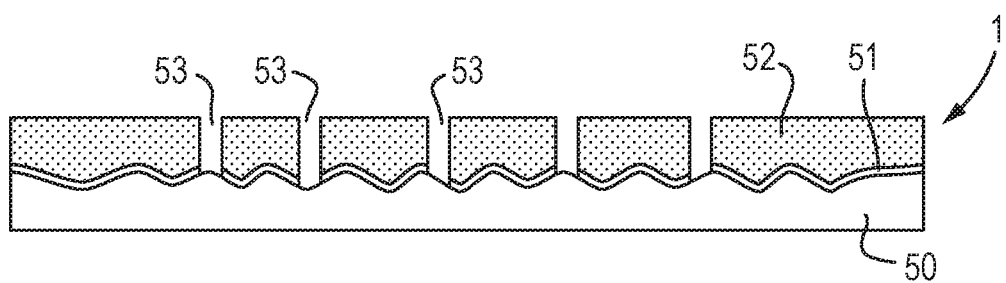

The layer 52 could also act as a resist layer. For example, as shown in FIG. 24(b), the layer 52 could be selectively applied to certain areas only of the device (e.g. by printing), resulting in gaps 53 which preferably define an image. The patterned layer 52 can then be used as an etch resist such that portions of the reflection enhancing layer 51 corresponding to each of the gaps are removed, resulting in a demetallised image.

Figure 24C:
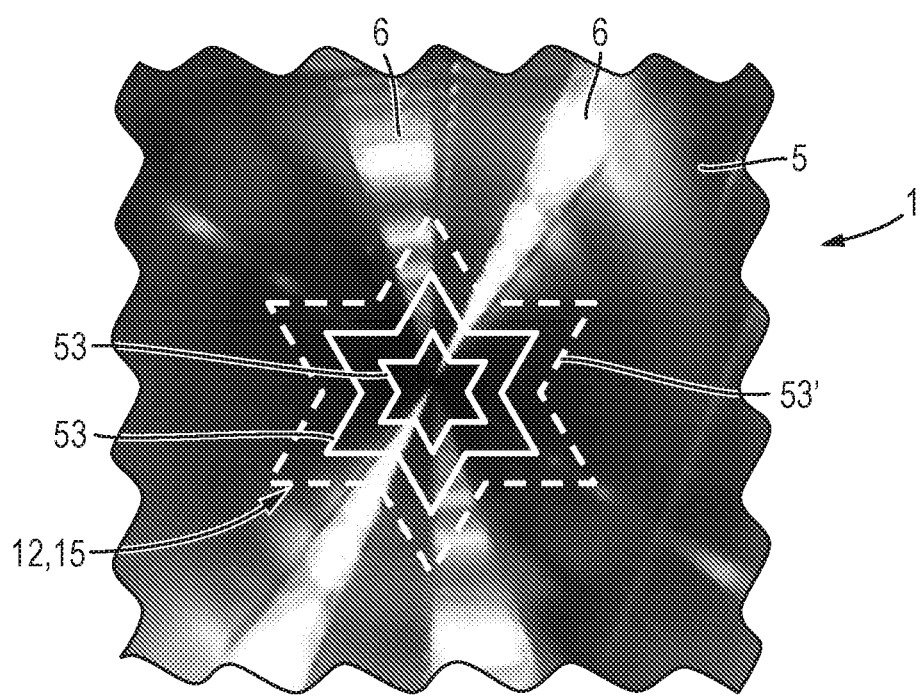

FIG. 24(c) shows an example of a security device 1 in plan view with a demetallised image 53. Here the demetallised image has the form of two concentric stars which are preferably centred on the reference point P of the first diffraction pattern 5 so as to demonstrate accurate register between the demetallisation and the diffractive structure. The edge 53' of the device is also patterned by further demetallisation. In this example, the second diffraction effect 15 is provided in the form of a star-shaped outline 12 which is also concentric with the demetallised image 53 to further increase the visual integration of the different aspects of the device.

Figure 25A:
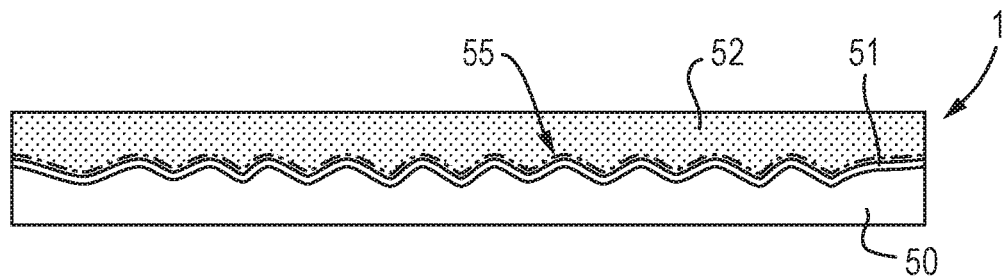
Figure 25B:
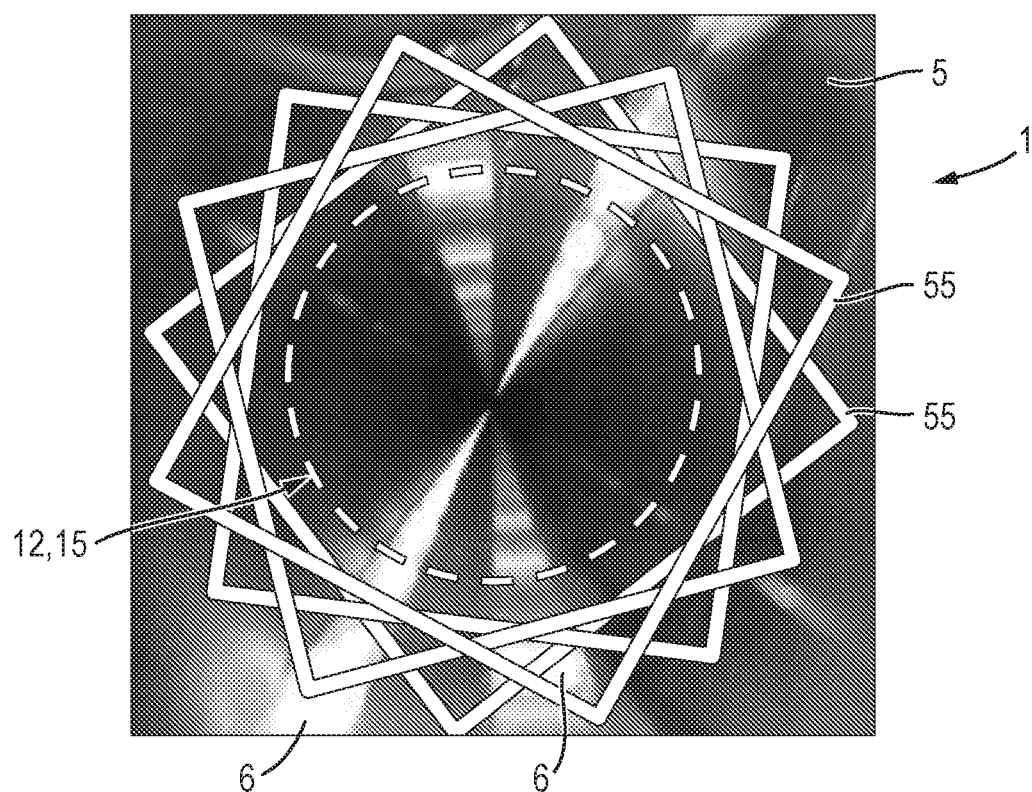

The security device may alternatively or additionally be provided with an image layer such as a printed image. FIG. 25(a) is a cross section showing an example of a security device 1 with an image layer 55, which in this case is applied to the reflection enhancing layer 51. In other examples the image layer 55 could be applied between the carrier 50 and the reflection enhancing layer 51, or even on the outside of carrier 50 or protective lacquer 52. An example of an image carried by layer 55 is shown in FIG. 25(b). Here a printed image 55 is provided in the form of a series of rotated squares forming a multi-pointed star pattern. The ink or other material forming the image layer 55 is preferably at least semi-opaque so that the diffractive effects are concealed under the image layer where it is present. The image 55 is preferably centred on the reference point of the first diffractive structure so as demonstrate register between the two. In this case, the second diffractive structure 15 is provided in the form of a circular outline 12 also centred on the reference point.

FIGS. 26, 27 and 28 depict examples of security documents in which security devices of the sorts described above have been incorporated. FIG. 26 shows a first exemplary security document, here a banknote 100, in (a) plan view and (b) cross-section along line Q-Q'. Here, the banknote 100 is a polymer banknote, comprising an internal transparent polymer substrate 102 which is coated on each side with opacifying layers 103a and 103b in a conventional manner. In some cases, the opacifying layers may be provided on one side of the substrate 102 only. The opacifying layers 103a and 103b are omitted in a region of the document so as to define a window 101, here having a square shape. Within the window region 101 is located a security device 1 in accordance with any of the embodiments discussed above. The security device 1 may be formed by cast-curing a suitable carrier material 50 onto the substrate 102, in which the desired relief structure is formed. Alternatively, the security device 1 may have been formed separately on a security article such as a transfer patch or label. In this case, the security device 1 may be affixed to the transparent substrate 102 inside the window region 101 by means of a suitable adhesive. Application may be achieved by a hot or cold transfer method e.g. hot stamping.

It should be noted that a similar construction could be achieved using a paper/plastic composite banknote in which the opacifying layers 103a and 103b are replaced by paper layers laminated (with or without adhesive) to an internal transparent polymer layer 102. The paper layers may be omitted from the window region from the outset, or the paper could be removed locally after lamination. In other constructions, the order of the layers may be reversed with a (windowed) paper layer on the inside and transparent polymer layers on the outside.

Security devices of the sort disclosed herein are particularly well suited to application to documents with polymer substrates such as that shown in FIG. 26 since zone plate structures such as those used to form the first diffractive structure replay particularly well when they are supported on a flat, smooth surface. The surface of a polymer substrate is typically smoother than those of conventional, e.g. paper substrates.

In FIG. 27, the banknote 100 is of conventional construction having a substrate 102 formed for example of paper or other relatively opaque or translucent material. The window region 101 is formed as an aperture through the substrate 102. The security device 1 is applied as a patch overlapping the edges of window 101 utilising an adhesive to join the security article to the document substrate 102. Again, the application of the security device and document could be achieved using various methods including hot stamping.

FIG. 27(b) shows a variant in which the window 101 is omitted and the device 1 is simply applied to a section of the substrate 102 using any convenient application technique such as hot stamping. In such arrangements the device 1 will of course only be viewable from one side of the security document 100.

FIG. 28 depicts a third example of a security document, again a banknote 100, to which a security article 105 in the form of a security thread or security strip has been applied. Three security devices 1 each carried on the strip 105 are revealed through windows 101, arranged in a line on the document 100. Two alternative constructions of the document are shown in cross-section in FIGS. 28(b) and 28(c). FIG. 28(b) depicts the security thread or strip 105 incorporated within the security document 100, between two portions of the document substrate 102a, 102b. For example, the security thread or strip 105 may be incorporated within the substrate's structure during the paper making process using well known techniques. To form the windows 101, the paper may be removed locally after completion of the paper making process, e.g. by abrasion. Alternatively, the paper making process could be designed so as to omit paper in the desired window regions. FIG. 28(*c*) shows an alternative arrangement in which the security thread or strip 105 carrying the security device 1 is applied to one side of document substrate 102, e.g. using adhesive. The windows 101 are formed by the provision of apertures in the substrate 102, which may exist prior to the application of strip 105 or be formed afterwards, again for example by abrasion.

Many alternative techniques for incorporating security documents of the sorts discussed above are known and could be used. For example, the above described device structures could be formed on other types of security document including identification cards, driving licenses, bankcards and other laminate structures, in which case the security device may be incorporated directly within the multilayer structure of the document.

The invention claimed is:

1. A diffractive security device comprising first and second diffractive structures defined in a carrier layer, the first diffractive structure being a diffractive zone plate structure of a continuously curved surface configured such that when the device is illuminated by on-axis light a first diffraction pattern generated by the first diffractive structure can be viewed from at least a first side of the device at substantially all viewing angles, the first diffraction pattern exhibiting a reference point or reference line relative to which other features of the first diffraction pattern appear to move when the viewing angle is changed; and the second diffractive structure being an off-axis diffractive structure configured such that when the device is illuminated by on-axis light a second diffraction pattern generated by the second diffractive structure can be viewed from at least the first side of the device at at least some off-axis viewing angles, wherein the second diffractive structure comprises a plurality of laterally offset portions, each portion of the second diffractive structure being configured such that when the device is illuminated by on-axis light the portion of the second diffraction pattern generated by the respective portion of the second diffractive structure can be viewed only from a respective subset of one or more predetermined off-axis viewing angles, the respective subsets of viewing angles being different for different portions of the second diffractive structure such that when the viewing angle is changed different portions of the second diffractive device diffract light to the viewer in sequence, whereby the second diffraction pattern appears to change;

wherein the device has one or more first regions in which the first diffractive structure is present but not the second diffractive structure, and the device has a plurality of spaced second regions in which the second diffractive structure is present, the first region(s) being arranged between the second regions whereby the first and second regions are interspersed with one another across the device, such that the first diffraction pattern is exhibited across the device at all viewing angles and at at least some viewing angles the second diffraction pattern appears superimposed on the first diffraction pattern and upon changing the viewing angle the second diffraction pattern exhibits a change referenced against the reference point or reference line of the first diffraction pattern;

wherein the second diffractive structure is configured such that, upon a change in viewing angle, at least some of the portions thereof direct diffracted light to the viewer in turn, the pitch and/or orientation of the second diffractive structure being different in each portion such that the second diffraction pattern becomes visible in each of the plurality of second regions in the same sequence as the order in which the second regions are spatially arranged on the device, such that the location and/or extent of the second diffraction pattern appears to move relative to the reference point or line of the first diffraction pattern.

2. A diffractive security device according to claim 1, wherein the first diffractive structure is a diffractive zone plate structure of a dome, a hemisphere, a hemi-ellipsoid, a semi-cylinder, a semi-toroid, or a portion thereof.

3. A diffractive security device according to claim 1, wherein the diffractive zone plate structure is a phase difference zone plate structure formed as a surface relief in the carrier layer, the diffractive security device further comprising a reflection enhancing layer following contours of the surface relief on the carrier layer.

4. A diffractive security device according to claim 1 wherein the second diffractive structure is configured such that, upon a change in viewing angle, at least some of the portions thereof exhibit a change in colour of the diffracted light directed to the viewer, the change in colour occurring progressively from one portion to the next such that the diffracted colours of the second diffractive structure appear to move relative to the reference point or line of the first diffraction pattern.

5. A diffractive security device according to claim 1 wherein the second diffractive structure is configured such that the second diffraction pattern appears to change upon tilting and/or rotation of the viewing angle.

6. A diffractive security device according to claim 1 wherein each of the plurality of portions of the second diffractive structure comprises a diffraction grating structure, the pitch and/or the orientation of the diffraction grating structure in each portion being different.

7. A diffractive security device according to claim 6, wherein the portions of the second diffractive structure are arranged in the second regions of the device such that the pitch and/or orientation change progressively from one second region to the next in the same sequence as the order in which the second regions are spatially arranged on the device.

8. A diffractive security device according to claim 6, wherein at least some of the diffraction grating structures in the respective portions have different pitches from one another, each pitch lying in the range 0.5 microns to 10 microns.

9. A diffractive security device according to claim 6, wherein at least some of the diffraction grating structures in the respective portions have different orientations from one another in the plane of the device, including at least two diffraction grating structures in respective portions with orientations differing from one another by substantially 90 degrees.

10. A diffractive security device according to claim 1, wherein each of the second regions of the device corresponds to a different one of the plurality of portions of the second diffractive structure.

11. A diffractive security device according to claim 1 wherein the second regions of the device are arranged so as to define indicia or a pattern which surrounds.

12. A diffractive security device according to claim 11, wherein the second regions comprise at least two spaced areas each defining different respective parts of the indicia or pattern and the second diffractive structure is configured such that different ones of the at least two spaced areas direct diffracted light to the viewer at different viewing angles whereby different parts of the indicia or pattern are visible as the viewing angle is changed.

13. A diffractive security device according to claim 1, wherein the first and second diffractive structures are combined in the second regions and configured such that, when the device is viewed from one of the subset of predetermined off-axis viewing angles at which the second diffraction pattern is visible in at least one second region, the device exhibits the first diffraction pattern in the first region(s) and the second diffraction pattern in the at least one second region, and when the device is viewed from a different viewing angle at which the second diffraction pattern is not visible in the at least one second region, the device exhibits the first diffraction pattern in the first region(s) and in the at least one second region with substantially no contrast between the first region(s) and the at least one second region.

14. A diffractive security device according to claim 13, wherein within the or each second region of the device, the first diffractive structure is present only in a first array of elemental areas, and the second diffractive structure is present only in an second array of elemental areas, the elemental areas of the first array being interposed with the elemental areas of the second array, the elemental areas of the first and second arrays being sufficiently small so as not to be individually detectable to the naked eye.

15. A diffractive security device according to claim 13, wherein within the or each second region of the device, the first and second diffractive structures are superposed on top of one another, the second diffractive structure modifying the first diffractive structure.

16. A security article comprising a security device according to claim 1.

17. A security document comprising a security device according to claim 1, or a security article comprising a security device, the security document comprising a banknote, identity document, passport, cheque, visa, licence, certificate, or stamp.

18. A method of making a diffractive security device, comprising forming first and second diffractive structures in a carrier layer,
the first diffractive structure being a diffractive zone plate structure of a continuously curved surface configured such that when the device is illuminated by on-axis light a first diffraction pattern generated by the first diffractive structure can be viewed from at least a first side of the device at substantially all viewing angles, the first diffraction pattern exhibiting a reference point or reference line relative to which other features of the first diffraction pattern appear to move when the viewing angle is changed; and
the second diffractive structure being an off-axis diffractive structure configured such that when the device is illuminated by on-axis light a second diffraction pattern generated by the second diffractive structure can be viewed from at least the first side of the device at at least some off-axis viewing angles, wherein the second diffractive structure comprises a plurality of laterally offset portions, each portion of the second diffractive structure being configured such that when the device is illuminated by on-axis light the portion of the second diffraction pattern generated by the respective portion of the second diffractive structure can be viewed only from a respective subset of one or more predetermined off-axis viewing angles, the respective subsets of viewing angles being different for different portions of the second diffractive structure such that when the viewing angle is changed different portions of the second diffractive device diffract light to the viewer in sequence, whereby the second diffraction pattern appears to change;
wherein the device has one or more first regions in which the first diffractive structure is present but not the second diffractive structure, and the device has a plurality of spaced second regions in which the second diffractive structure is present, whereby the first and second regions are interspersed with one another across the device, such that the first diffraction pattern is exhibited across the device at all viewing angles and at at least some viewing angles the second diffraction pattern appears superimposed on the first diffraction pattern and upon changing the viewing angle the second diffraction pattern exhibits a change referenced against the reference point or reference line of the first diffraction pattern;
wherein the second diffractive structure is configured such that, upon a change in viewing angle, at least some of the portions thereof direct diffracted light to the viewer in turn, the pitch and/or orientation of the second diffractive structure being different in each portion such that the second diffraction pattern becomes visible in each of the plurality of second regions in the same sequence as the order in which the second regions are spatially arranged on the device, such that the location and/or extent of the second diffraction pattern appears to move relative to the reference point or line of the first diffraction pattern.

19. A method of making a diffractive security device according to claim 18, wherein the first and second diffractive structures are formed by:
providing a replication tool having a surface relief defining the first and second diffractive structures; and
using the replication tool to form a surface of the carrier layer according to the surface relief.

20. A method of making a diffractive security device according to claim 19, wherein the replication tool is manufactured by creating the surface relief in a recording medium layer.

21. A method of making a diffractive security device according to claim 20, wherein the surface relief is created in a recording medium layer by forming a first surface relief structure corresponding to the first diffractive structure and then in the second regions of the device modifying or destroying the first surface relief structure by forming a second surface relief structure corresponding to the second diffractive structure.

22. A method of making a diffractive security device according to claim 21, wherein either:
the first surface relief structure is holographically generated by exposing the recording medium layer to a light interference pattern from the continuously curved surface; or
the first surface relief structure is formed using an optical fringe writer or electron beam lithography.

23. A method of making a diffractive security device according to claim 21, wherein either:

the second surface relief structure is holographically generated by exposing the recording medium layer to a light interference pattern from an off-axis transmission hologram; or the second surface relief structure is formed using an optical fringe writer or electron beam lithography.

24. A method of making a diffractive security device according to claim 20, wherein the surface relief is created in a recording medium layer by digitally combining a first surface relief structure corresponding to the first diffractive structure and a second surface relief structure corresponding to the second diffractive structure such that in the second regions of the device the first surface relief structure is modified or destroyed and forming the surface of the recording medium layer in accordance with the combined surface relief.

* * * * *